United States Patent
Weems et al.

(10) Patent No.: US 8,297,476 B2
(45) Date of Patent: Oct. 30, 2012

(54) QUICK CONNECT GREASE GUN BARREL AND METHOD OF USE

(75) Inventors: R. Mark Weems, Cedar Rapids, IA (US); Don R. Linkletter, Cedar Rapids, IA (US)

(73) Assignee: Weems Industries, Inc., Marion, IA (US)

( * ) Notice: Subject to any disclaimer, the term of this patent is extended or adjusted under 35 U.S.C. 154(b) by 616 days.

(21) Appl. No.: 12/533,759

(22) Filed: Jul. 31, 2009

(65) Prior Publication Data

US 2010/0116850 A1    May 13, 2010

Related U.S. Application Data

(60) Provisional application No. 61/113,137, filed on Nov. 10, 2008.

(51) Int. Cl.
*G01F 11/00* (2006.01)
(52) U.S. Cl. .. 222/256; 222/1; 222/153.01; 222/153.09; 184/105.2
(58) Field of Classification Search ............... 222/1, 256, 222/262, 325–327, 372, 383.1, 153.09, 153.01; 285/305, 321, 319, 111, 39, 222.1, 222.2; 184/28, 105.2
See application file for complete search history.

(56) References Cited

U.S. PATENT DOCUMENTS

| | | | |
|---|---|---|---|
| 1,539,960 A | 6/1925 | Schenot | |
| 1,720,872 A | 7/1929 | Zerk | |
| 1,754,639 A * | 4/1930 | Meyer | 285/101 |
| 1,955,339 A | 4/1934 | McConkey | |
| 1,998,751 A | 4/1935 | Creveling | |
| 2,039,881 A | 5/1936 | Carter | |
| 2,901,269 A | 8/1959 | Rickard | |
| 3,428,340 A * | 2/1969 | Pelton | 285/95 |
| 3,980,209 A | 9/1976 | Collar | |
| 3,993,226 A | 11/1976 | Pavenick | |
| 4,113,059 A | 9/1978 | Markovski | |
| 4,533,069 A | 8/1985 | Drobish | |
| 4,601,412 A | 7/1986 | Martin | |

(Continued)

FOREIGN PATENT DOCUMENTS

GB    2273745    6/1994

(Continued)

OTHER PUBLICATIONS

Notification of Transmittal of the International Search Report and Written Opinion of the International Searching Authority (EP); for PCT/US2009/052453 filed on Jul. 31, 2009.

*Primary Examiner* — Frederick C. Nicolas
(74) *Attorney, Agent, or Firm* — Brick Gentry P.C.; Brian J. Laurenzo

(57) ABSTRACT

A grease gun is provided comprises a body having a reservoir connection aperture with an inner portion, an outer portion and a plurality of concentric grooves positioned along the inner portion, a grease reservoir is in communication with the reservoir connection aperture and has a groove in a portion of an outside surface of the grease reservoir, and a retention fastener is received by at least one concentric groove and is in operational engagement with the grease reservoir groove to removably retain the grease reservoir. A method of mounting a barrel to a grease gun is also provided.

20 Claims, 21 Drawing Sheets

U.S. PATENT DOCUMENTS

| | | | |
|---|---|---|---|
| 4,796,786 A | 1/1989 | Czech | |
| 4,966,537 A | 10/1990 | Bowles et al. | |
| 4,991,880 A * | 2/1991 | Bernart | 285/321 |
| 5,332,127 A * | 7/1994 | White | 222/214 |
| 5,333,760 A | 8/1994 | Simmen | |
| 5,692,642 A | 12/1997 | Brattesani | |
| 5,743,436 A | 4/1998 | Wilcox et al. | |
| 5,772,079 A | 6/1998 | Gueret | |
| 5,992,569 A | 11/1999 | Dawson | |
| 6,047,862 A | 4/2000 | Davies | |
| 6,056,165 A | 5/2000 | Speranza | |
| 6,102,447 A * | 8/2000 | Aldridge | 285/305 |
| 6,223,941 B1 | 5/2001 | Nealey | |
| 6,302,304 B1 | 10/2001 | Spencer | |
| 6,467,579 B1 | 10/2002 | Simon | |
| 6,561,720 B2 * | 5/2003 | Wirth et al. | 403/280 |
| 6,604,760 B2 * | 8/2003 | Cresswell et al. | 285/305 |
| 6,676,172 B2 * | 1/2004 | Alksnis | 285/319 |
| 6,722,537 B1 | 4/2004 | Houlbrook | |
| 7,040,667 B2 * | 5/2006 | Nieslony | 285/276 |
| 7,201,403 B2 * | 4/2007 | Takayanagi et al. | 285/321 |
| 7,438,328 B2 * | 10/2008 | Mori et al. | 285/305 |
| 7,469,803 B2 * | 12/2008 | Weems et al. | 222/262 |
| 7,527,176 B2 * | 5/2009 | Weems et al. | 222/262 |
| 7,708,320 B2 * | 5/2010 | Binder et al. | 285/308 |
| 7,985,068 B2 * | 7/2011 | Burdsall et al. | 431/344 |
| 2005/0230429 A1 | 10/2005 | Weems et al. | |

FOREIGN PATENT DOCUMENTS

| | | |
|---|---|---|
| JP | 05060281 | 3/1993 |
| JP | 07061484 | 3/1995 |
| WO | WO-9843012 | 10/1998 |

* cited by examiner

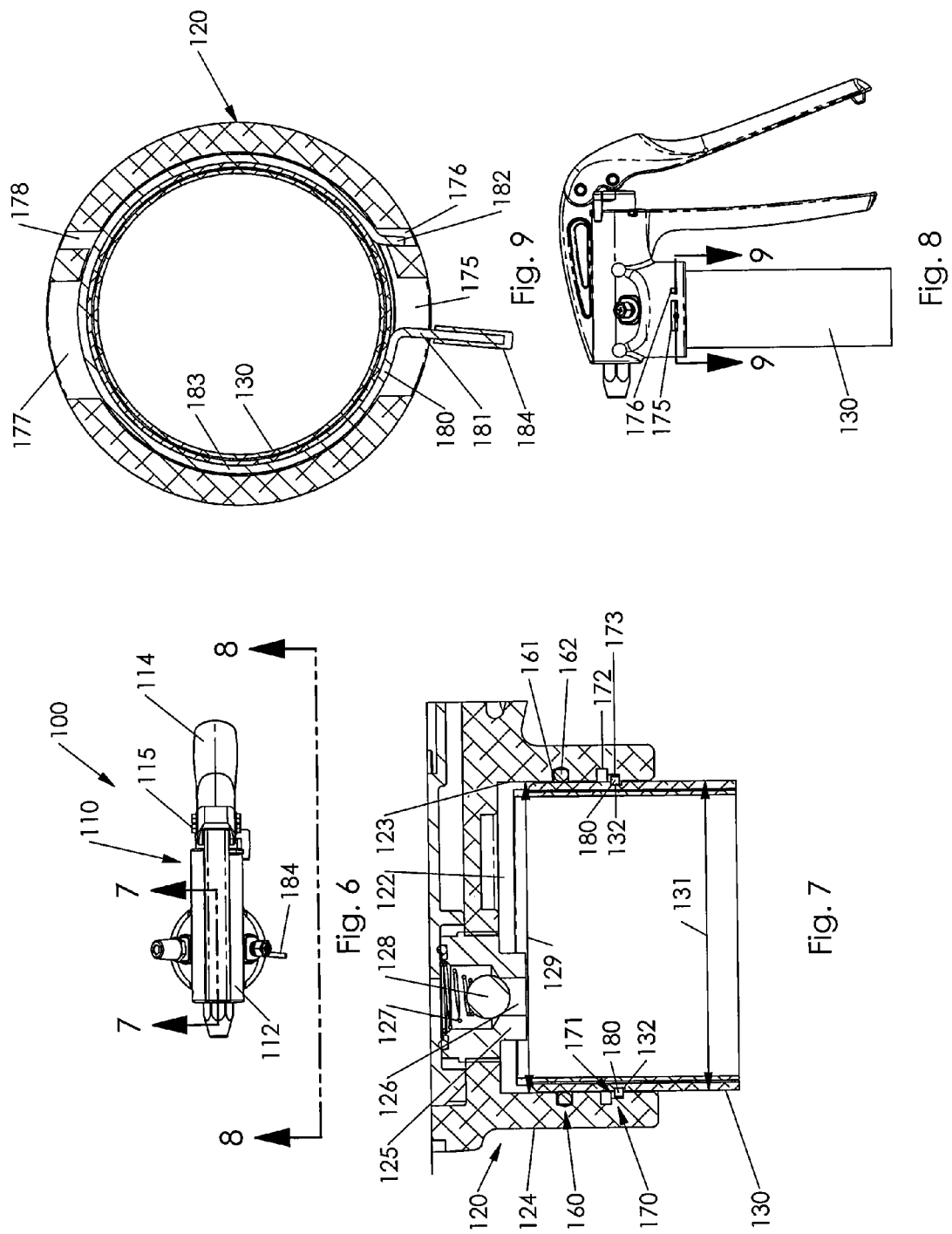

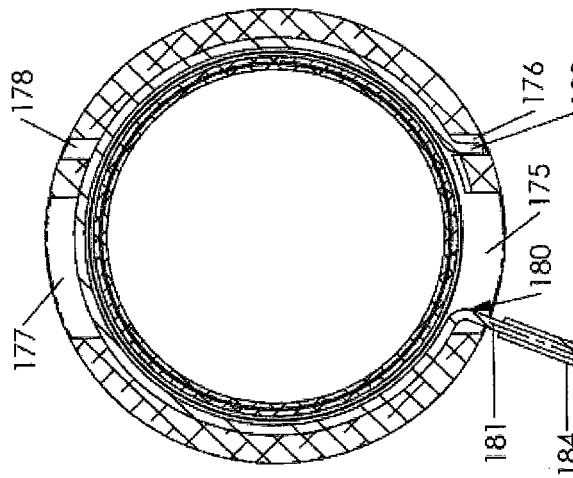
Fig. 16
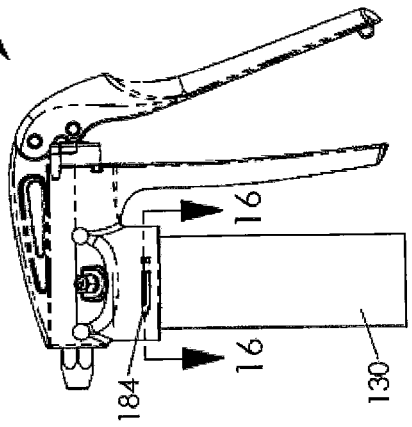
Fig. 15
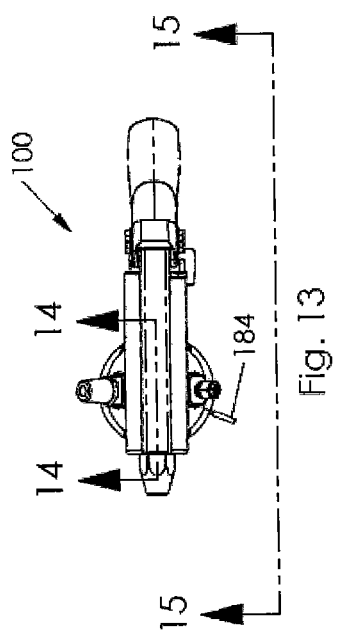
Fig. 13
Fig. 14

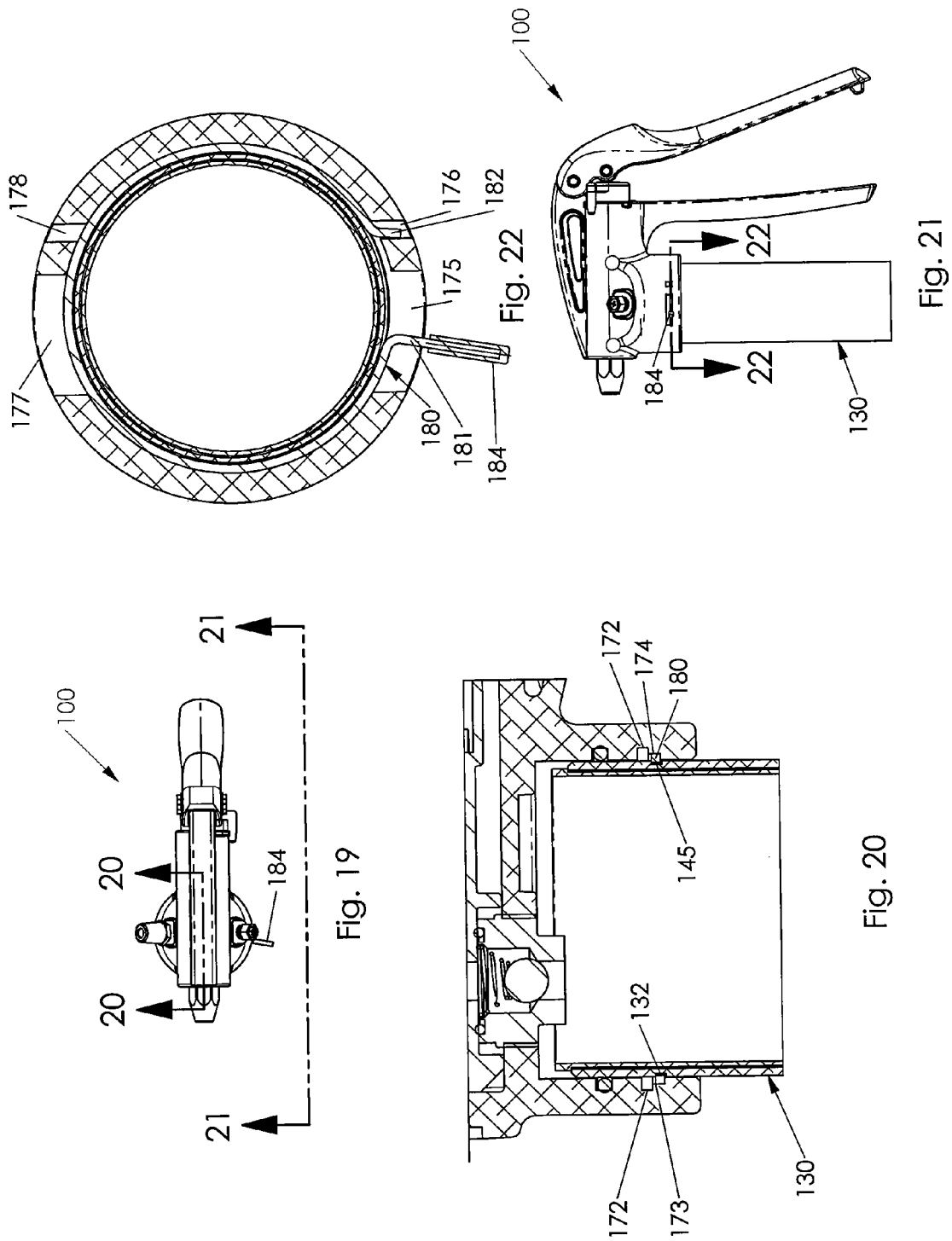

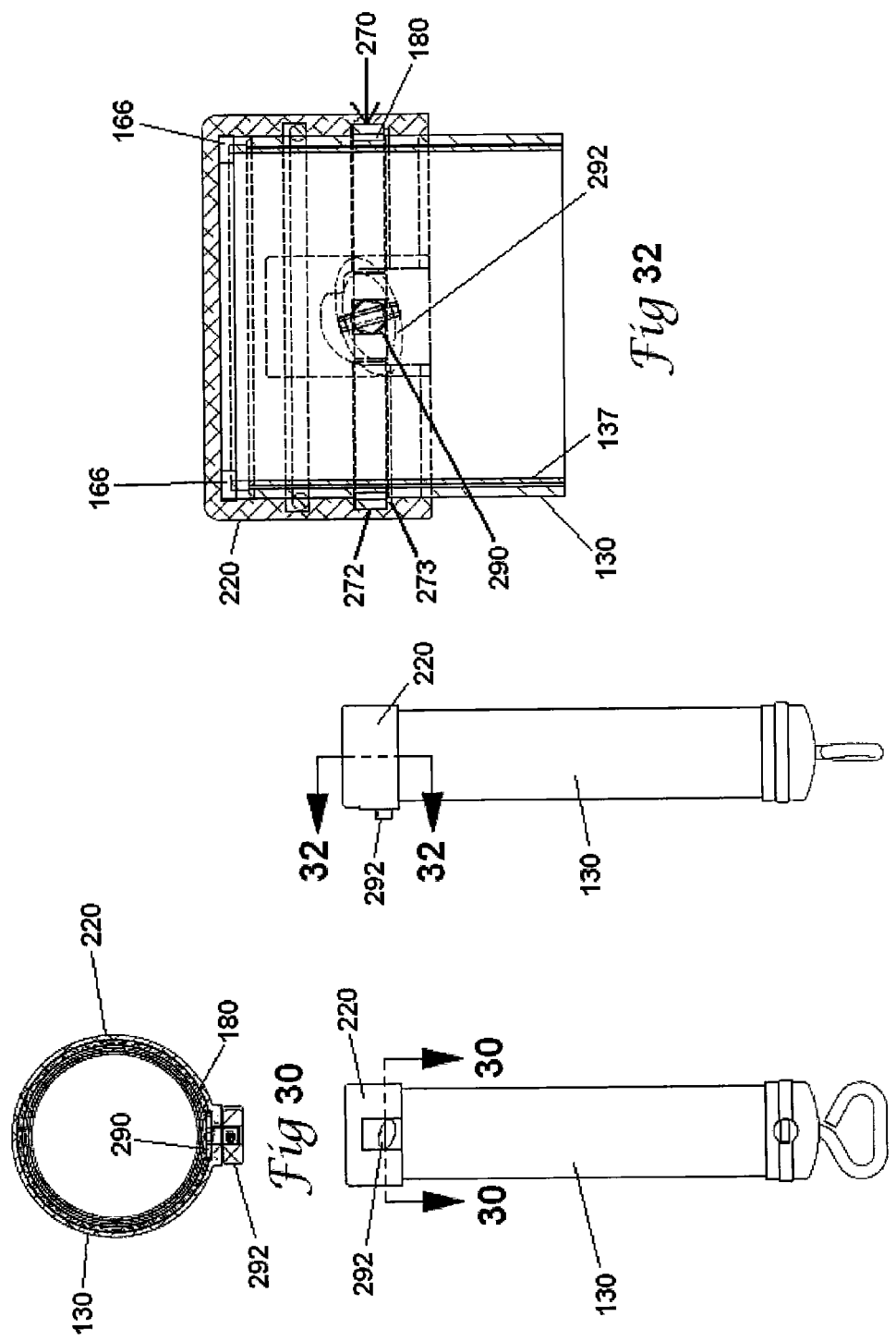

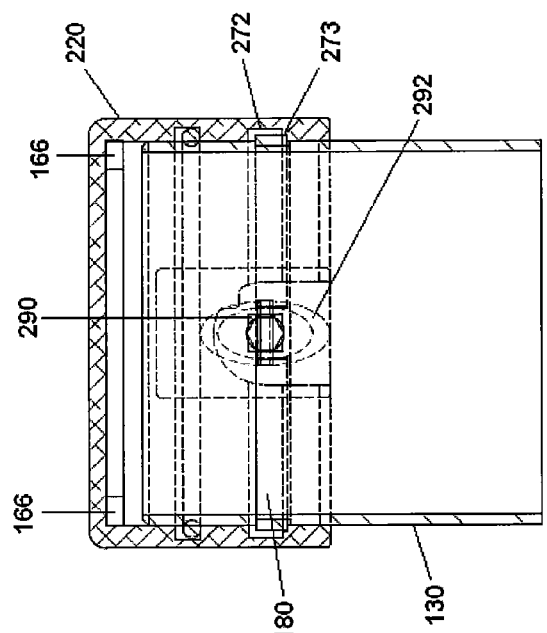
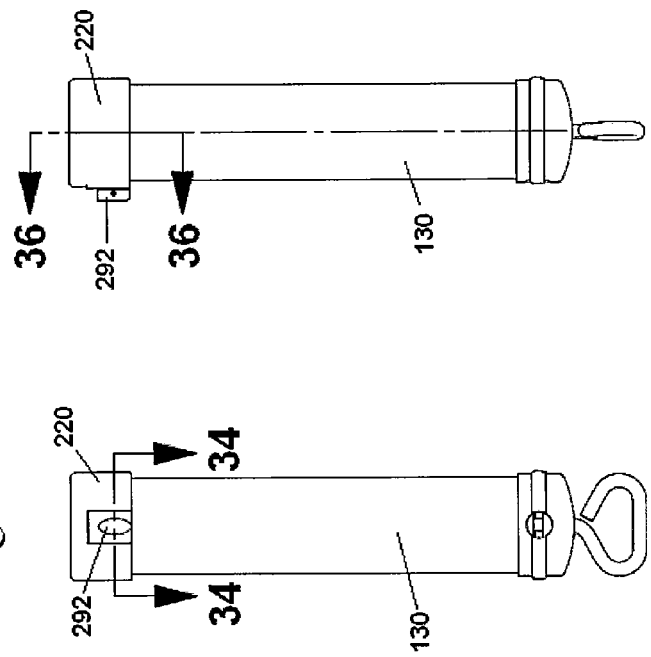
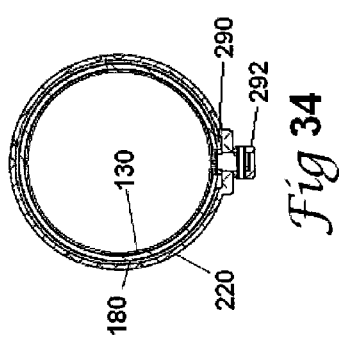
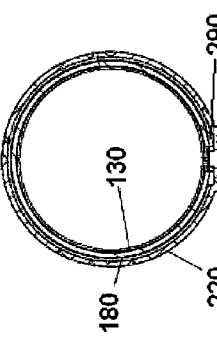

_US 8,297,476 B2_

1

QUICK CONNECT GREASE GUN BARREL AND METHOD OF USE

CROSS-REFERENCE TO RELATED APPLICATIONS

This application claims priority to U.S. Provisional Patent Application Ser. No. 61/113,137, filed Nov. 10, 2008, entitled Quick Connect Grease Gun Barrel, which is incorporated herein in its entirety by reference.

FIELD OF THE INVENTION

The present invention relates to grease guns. More specifically, the present invention relates to an attachment apparatus for connection, use and removal of a grease reservoir with a grease gun.

BACKGROUND

Grease guns and grease reservoirs for delivery of grease from the guns are known in the art. Currently available systems use threads cut or formed into the outside diameters of an end of a grease reservoir, for example a grease barrel. These threads mate with threads cut or formed in the receiving bore of a grease gun head or body. In order for the grease barrel to properly mate with the receiving bore, the barrel must be rotated 360 degrees numerous times in order to compress a gasket against either an end of the receiving bore or an end of the barrel. The number of barrel rotations can range between as few as three times up to and including seven times. This repeated rotation leads to inefficiency caused by the amount of time involved, potential injury to the person rotating the barrel, and generally is an inconvenience to the user. In addition, due to the threads positioned in the receiving bore, it is not possible to use a radial seal to seal the grease barrel and the receiving bore of the grease gun. Current grease guns are limited to using axial or face seals which are compressed or squeezed between the grease gun and the top portion of the grease barrel.

Accordingly, an improved device and method of attaching, sealing and removing a grease reservoir from a grease gun is provided.

SUMMARY OF THE INVENTION

A grease gun is disclosed having a body with a reservoir connection aperture. The reservoir connection aperture includes an inner portion, an outer portion and a plurality of concentric grooves positioned along the inner portion. A grease reservoir is in communication with the reservoir connection aperture and includes a groove in a portion of the outside surface of the grease reservoir. A retention fastener is removably received by at least one of the concentric grooves and is in operational engagement with the grease reservoir groove to removably retain the grease reservoir in the grease gun.

A method of mounting a barrel to a grease gun is also provided. The method includes the steps of inserting the barrel into a barrel mount in the grease gun body, aligning a groove on the barrel with a snap ring movably retained within at least one of a plurality of concentric grooves in the barrel mount, and engaging the snap ring with the groove on the barrel and at least one of the plurality of concentric grooves, thereby preventing disengagement of the barrel from the grease gun.

BRIEF DESCRIPTION OF THE DRAWINGS

FIG. 6 is a top plan view of a grease gun having a barrel mounted thereto of FIG. 1, showing the attachment fastener in an engaged position.

FIG. 7 is a cross-sectional view of the grease gun and mounted barrel of FIG. 1, taken along line 7-7 of FIG. 6.

FIG. 8 is a side elevation view of the grease gun and barrel of FIG. 1, taken along line 8-8 of FIG. 6.

FIG. 9 is a cross-sectional view of the grease gun and barrel of FIG. 1, taken along line 9-9 of FIG. 8.

FIG. 13 is a top plan view of the grease gun having a barrel mounted thereto of FIG. 1, showing the attachment fastener in a disengaged position.

FIG. 14 is a cross-sectional view of the grease gun and mounted barrel of FIG. 13, taken along line 14-14 of FIG. 13.

FIG. 15 is a side elevation view of the grease gun and barrel of FIG. 13, taken along line 15-15 of FIG. 13.

FIG. 16 is a cross-sectional view of the grease gun and barrel of FIG. 13, taken along line 16-16 of FIG. 15.

FIG. 19 is a top plan view of the grease gun having a barrel mounted thereto of FIG. 1, showing the attachment fastener in a locked position.

FIG. 20 is a cross-sectional view of the grease gun and mounted barrel of FIG. 19, taken along line 20-20 of FIG. 19.

FIG. 21 is a side elevation view of the grease gun and barrel of FIG. 19, taken along line 21-21 of FIG. 19.

FIG. 22 is a cross-sectional view of the grease gun and barrel of FIG. 19, taken along line 22-22 of FIG. 21.

FIG. 29 is a side elevation view of a barrel and cap in an embodiment of the invention, showing the attachment fastener disengaged.

FIG. 30 is a cross-sectional view of the embodiment of FIG. 29, taken along line 30-30 of FIG. 29.

FIG. 31 is a further side elevation view of the embodiment of FIG. 29.

FIG. 32 is a cross-sectional view of the embodiment of FIG. 29, taken along line 32-32 of FIG. 31.

FIG. 33 is a side elevation view of a barrel and cap in an embodiment of FIG. 29, absent a cartridge and with the attachment fastener engaged.

FIG. 34 is a cross-sectional view of the embodiment of FIG. 33, taken from line 34-34 of FIG. 33.

FIG. 35 is a further side elevational view of the embodiment of FIG. 33.

FIG. 36 is a cross sectional view of the embodiment of FIG. 33, taken from line 36-36 of FIG. 35.

DETAILED DESCRIPTION

The invention shown in the Figures is generally directed to a grease gun 100, and in particular a quick connect and disconnect attachment assembly 170 for connecting a grease reservoir to a grease gun 100. For ease of discussion and understanding, the following detailed description and illustrations refer to the quick connect attachment assembly 170 for use with grease and a grease barrel 130. It should be appreciated that "grease" is provided for purposes of illustration, and the quick connect assembly may be used in a variety of devices for a variety of substances, including, but not limited to, grease, oil, semisolid or emulsified lubricants or other materials having a viscosity or rheological composition enabling semi-controlled conveyance. Further, it should be appreciated that a "grease barrel" is provided for purposes of illustration and the quick connect assembly may be used to connect a grease gun 100 with any type of grease reservoir, for example a reservoir, tank or storage receptacle of any shape or size. Further, the grease reservoir may include any device or method suitable for transferring grease from the reservoir to the grease gun, including, but not limited to, direct connection or by extension, for example by a hose. In one or more examples of embodiments, the barrel 130 may be substituted with an adapter in communication with a hose. In accordance with the present invention, the adapter may include a groove or slot similar to barrel groove 132 for operational engagement with the attachment assembly 170. The hose may then be in communication with a grease reservoir, allowing for a remote-feed application.

Figure 1:
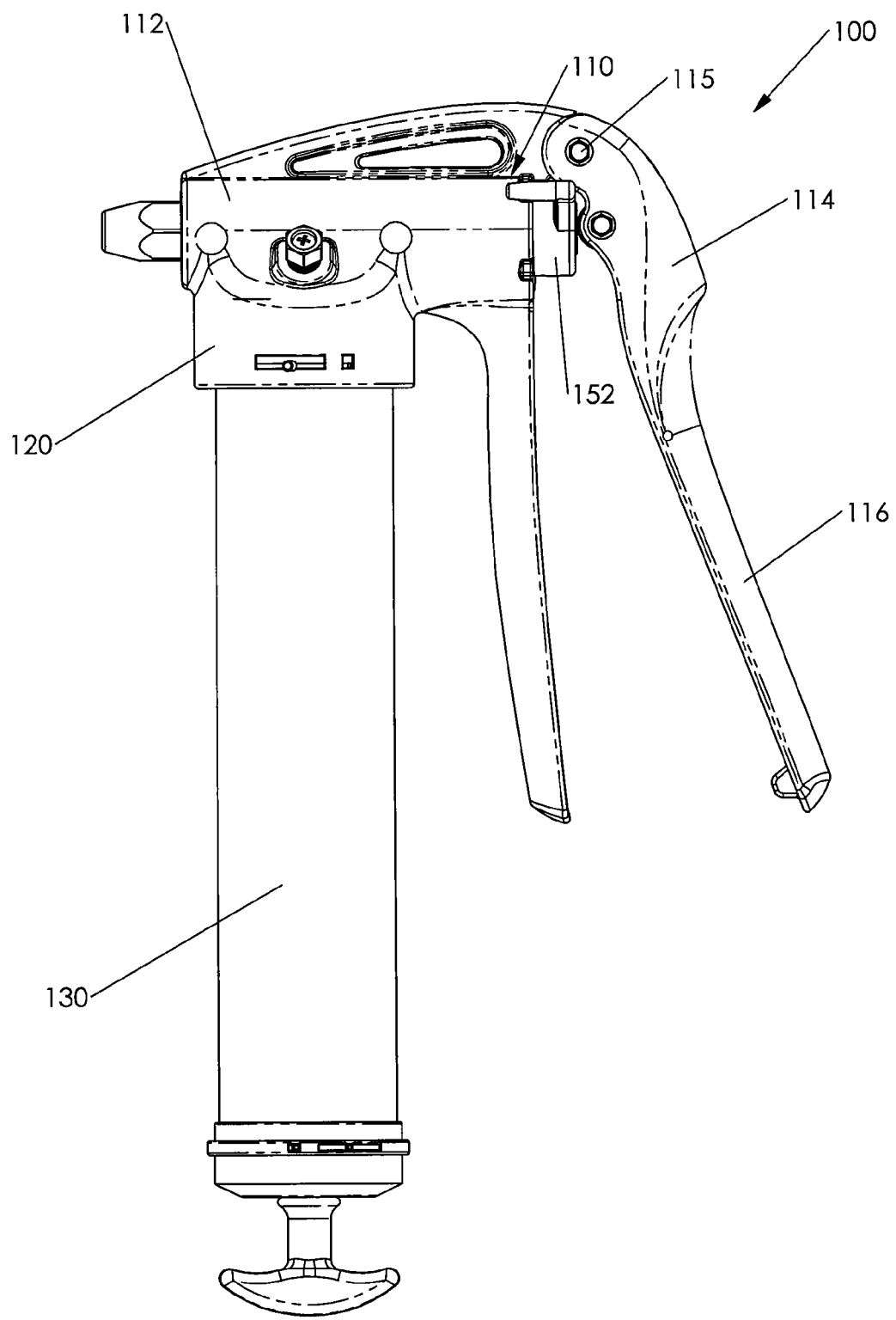
FIG. 1 is a side elevation view of a grease gun having a barrel mounted thereto in an embodiment of the present invention.

FIG. 1 illustrates a grease gun 100 in accordance with one of more examples of embodiments of the present invention. The grease gun 100 may include a grease gun body 110 and a grease reservoir, illustrated as a grease barrel 130. The grease barrel 130 may be removably connected to the grease gun body 110. The grease gun 100, the grease barrel 130 and the additional components described herein may be formed from die cast aluminum, injection molded plastic, composite material or by any other known and suitable materials, processes or methods.

Figure 2:
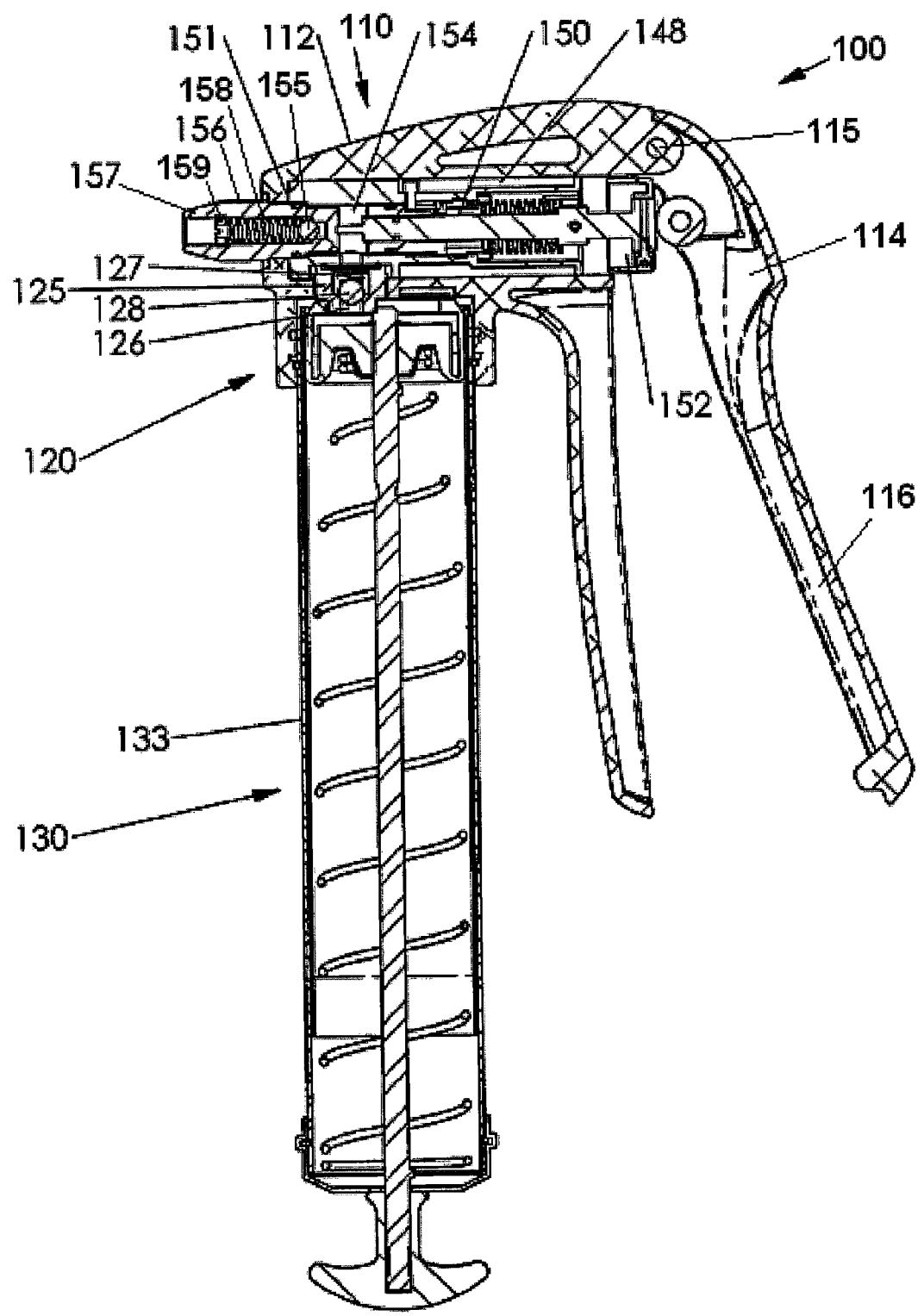
FIG. 2 is a cross-sectional view of the grease gun of FIG. 1.

Referring to FIGS. 1-2, the grease gun body 110 may include a grease gun head 112. As illustrated in FIG. 2, the grease gun head 112 may include a longitudinal bore 148 through a portion of the grease gun head 112. Operably received within the longitudinal bore 148 may be a plunger or piston assembly 150. The piston assembly 150 may include a discharge end 151. The piston assembly 150 further may be in communication with a compression chamber 154 which may pressurize grease within the grease gun body 110. In one or more examples of embodiments, a volume adjustment assembly or pressure adjustment assembly or toggle lever 152 may be operably connected to the piston assembly 150 to adjust volume or pressure of grease delivered by the grease gun 100.

Operably connected to the discharge end 151 of the piston assembly 150 may be an outlet valve or body 156. The outlet body 156 may include a nozzle 157 which may be removably connected to the discharge end 151 of the piston assembly 150. The outlet body 156 may also include an output check ball 155 biased by an output spring 158 which is retained in the outlet body 156 by an output check screw 159.

Figure 3:
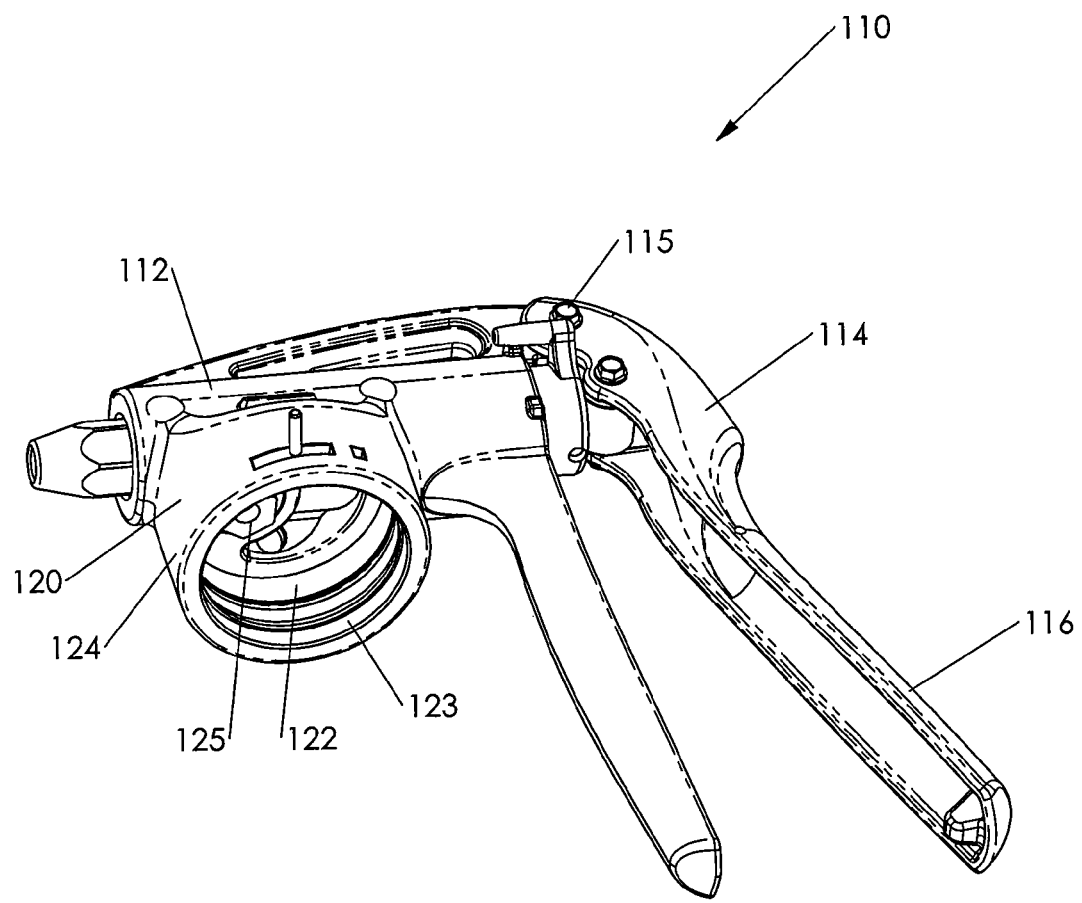
FIG. 3 is a perspective view of a grease gun body for use with the grease gun shown in FIG. 1.

Referring to FIGS. 1-3, the grease gun body 110 may include an actuation assembly 114. The actuation assembly 114 may be pivotally connected or retained to the grease gun body 110 by a pivot member 115. Further, the actuation assembly 114 may include an actuating lever 116. The actuating lever 116 may be arranged generally perpendicular to the longitudinal bore 148 and operably attached to the piston assembly 150. The actuating lever 116 may also be operably connected with the piston assembly 150. In one or more examples of embodiments, the pivot member 115 may include, but is not limited to, a hinge pin, a bolt and nut arrangement, pintle or similar member enabling pivotal movement of the actuation assembly 114 about the grease gun body 110. In one or more examples of embodiments, the actuating lever 116 may be constructed of different lengths, sizes, shapes, and arrangements to permit single hand operation, multi-hand operation, left-hand only operation or right-hand only operation. Further, in one or more examples of embodiments, the grease gun 100 and grease gun body 110 may include alternate grease distribution assemblies, including, but not limited to, manual operation, air or pneumatic operation, battery power operation, or electric power operation.

The grease gun body 110 may include a reservoir connection aperture or barrel mount 120. The barrel mount 120 may be integrally connected to the grease gun body 110 as a unitary assembly. The barrel mount 120 may include a recess or receiving bore 122 sized to removably receive a reservoir or barrel 130. As shown in FIG. 3, the receiving bore 122 may have an inner portion or inner surface 123 and an outer portion or outer surface 124. As illustrated in FIG. 7, the receiving bore 122 inner portion 123 may include an inner diameter 129. The inner diameter 129 may be sized to correspond and operably mate with a barrel 130, and specifically an outer diameter 131 of the barrel 130 (see FIGS. 7 and 25). In one or more examples of embodiments, the barrel mount 120 may be connected to the grease gun body 110 by alternate methods, including, but not limited to, weld, casting, forging, or other permanent or semi-permanent attachment method with sufficient strength to allow operation of the grease gun 100. Further, in one or more examples of embodiments, the receiving bore 122 may be of different shapes, sizes, diameters, lengths or heights to correspond with different sizes or types of reservoirs or barrels 130. In addition, in one or more examples of embodiments and in accordance with the present invention, the barrel mount 120 receiving bore 122 may be provided with different depths to removably receive or engage with different lengths of a barrel 130. This may allow for varying depths of engagement between the receiving bore 122 and barrel 130 without departing from the scope of the present invention. In one or more examples of embodiments, it is anticipated that the inner diameter 129 of the receiving bore 122 would closely approximate the outer diameter 131 of the barrel 130 so they may seal or tightly engage.

As illustrated in FIGS. 2 and 3, the barrel mount 120 receiving bore 122 may house an inlet valve body 125. Referring to FIGS. 2 and 7, the inlet valve body 125 may include an inlet throughbore 126. The inlet throughbore 126 enables transmission of grease or other material from the barrel 130 into the grease gun head 112. Further, the inlet throughbore 126 may allow for transmission of grease into the longitudinal bore 148 or compression chamber 154 of the grease gun head 112 (see FIG. 2). Positioned in operational alignment with the inlet throughbore 126 may be an inlet check ball 128 which may be biased by a valve spring 127.

Referring to FIG. 7, the barrel mount receiving bore 122 may include a sealing assembly or radial sealing assembly 160 to seal the connection between a portion of the barrel 130 and the inner portion 123 of the barrel mount receiving bore 122. The seal may limit or eliminate unwanted discharge of grease from the barrel 130 and/or barrel mount 120 during operation of the grease gun 100. The sealing assembly 160 may include a sealing recess or groove 161 positioned along the circumference of the inner portion 123 of the receiving bore 122. The sealing assembly 160 may further include a sealing member 162. The sealing member 162 may be an annular or toroidal member, for example an O-ring, which may be removably received or set in the sealing recess 161. The sealing member 162 may be sized to be slightly larger than the sealing recess 161 and may be formed of a flexible material. This enables the sealing member 162, upon insertion of a barrel 130 into the receiving bore 122, to deform and radially compress against the outer surface 133 of the barrel 130. In one or more examples of embodiments, the sealing assembly 160 may be positioned at any point along the inner portion 123 of the barrel mount receiving bore 122. Further, in one or more examples of embodiments, the sealing member 162 may be semi-permanently or permanently received in the sealing recess 161. In addition, in one or more examples of embodiments, the sealing member 162 may be formed of silicone, urethane, TEFLON®, Nitrile or Buna-N, or other natural or synthetic material suitable for sealing.

In one or more embodiments of the present invention, and referring to FIGS. 32 and 36, the barrel mount 120 receiving bore 122 may include a secondary sealing assembly 166. The secondary sealing assembly 166 may take the form of an annular or toroidal member, for example an O-ring, and may be removably received in a portion of the receiving bore 122. The secondary sealing assembly 166 may prevent grease from seeping or percolating between a grease cartridge and the inner wall of a grease barrel 130. The secondary sealing assembly 166 may be positioned above, or closer to the grease gun head 112, than the sealing member 162. As illustrated, the secondary sealing assembly 166 is positioned at and circumferentially around the base or inner most portion of the recess 122, or at the top of a received barrel 130. This may seal the contact location between the barrel 130 and the grease gun head 112. In one or more examples of embodiments, the secondary sealing assembly 166 may be similar in attachment, material, or shape as the sealing member 162. Further, in one or more examples of embodiments, the secondary sealing assembly 166 may be connected or attached to an end of the grease barrel 130.

Figure 12:
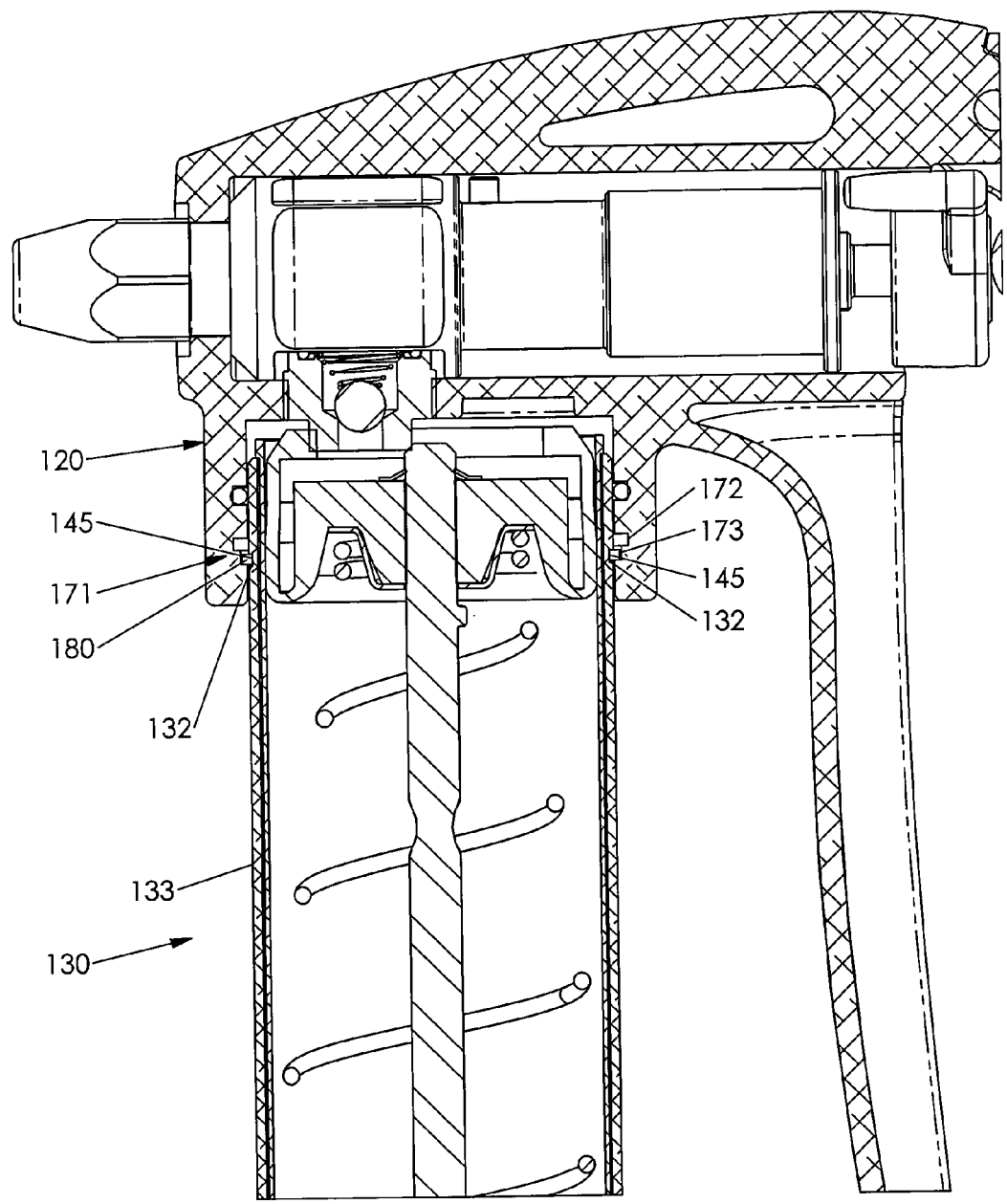
FIG. 12 is a partial cross-sectional view of the grease gun of FIG. 1, showing the attachment fastener in the engaged position.
Figure 17:
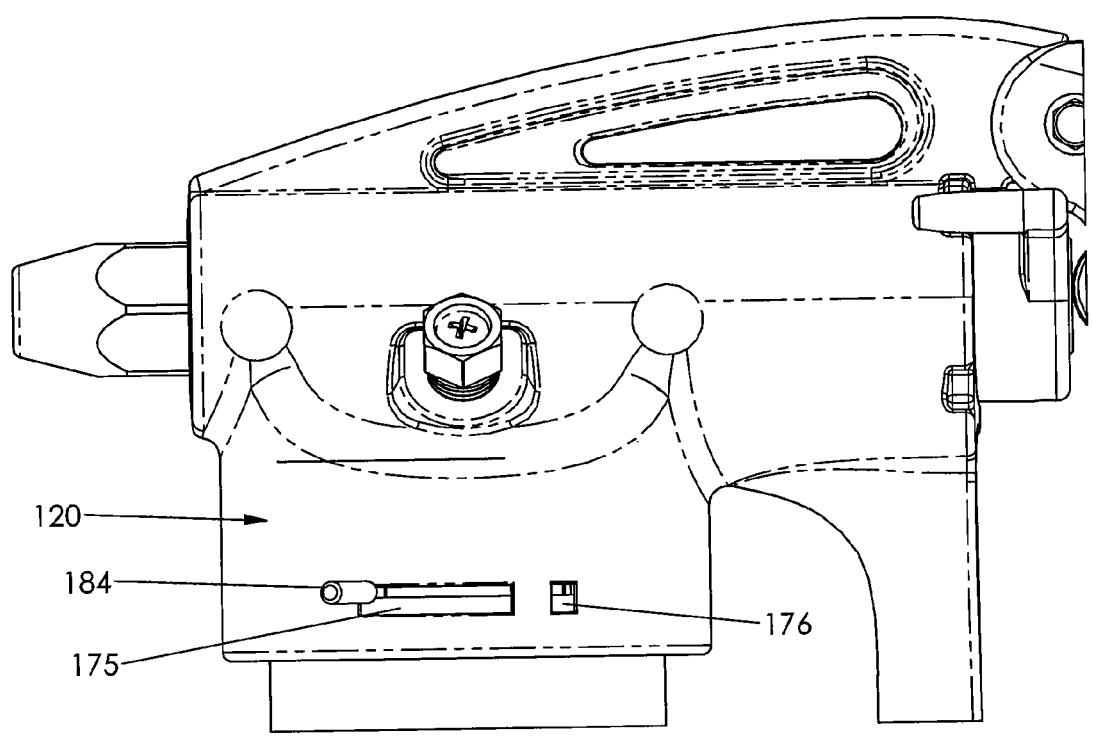
FIG. 17 is a partial side elevation view of the grease gun body of the grease gun shown in FIG. 14, showing the attachment fastener in the disengaged position.

The barrel mount receiving bore 122 may include an attachment assembly 170 allowing for adjustable securement of the barrel 130 with the barrel mount 120. As shown in FIG. 7, the attachment assembly 170 may include one or more concentric grooves or slots or trenches 171. The concentric grooves 171 may be positioned along the circumference of the inner portion 123 of the receiving bore 122. Referring to FIGS. 7 and 12, the concentric grooves 171 may include an upper channel or upper snap ring groove or first groove 172 and a lower channel or lower snap ring groove or second groove 173. The upper and lower snap ring grooves 172, 173 may be arranged in operational alignment, namely the retention fastener 180 may adjust or slide or move between the snap ring grooves 172, 173. As illustrated, the upper snap ring groove 172 is positioned adjacent and above the lower snap ring groove 173. The upper snap ring groove 172 may have a deeper recess from the inner portion 123 of the receiving bore 122 than the lower snap ring groove 173. Accordingly, the upper snap ring groove 172 may have a larger diameter than the lower snap ring groove 173. In one or more examples of embodiments, the concentric grooves 171 may be positioned at any location along the inner portion 123 of the barrel mount 120 receiving bore 122. Further, in one or more examples of embodiments, the attachment assembly 170 may include only one or three or more snap ring grooves. In addition, in one or more examples of embodiments, the snap ring grooves 172, 173 may be arranged so a groove with a larger diameter is positioned below the groove with the smaller diameter.

Figure 4:
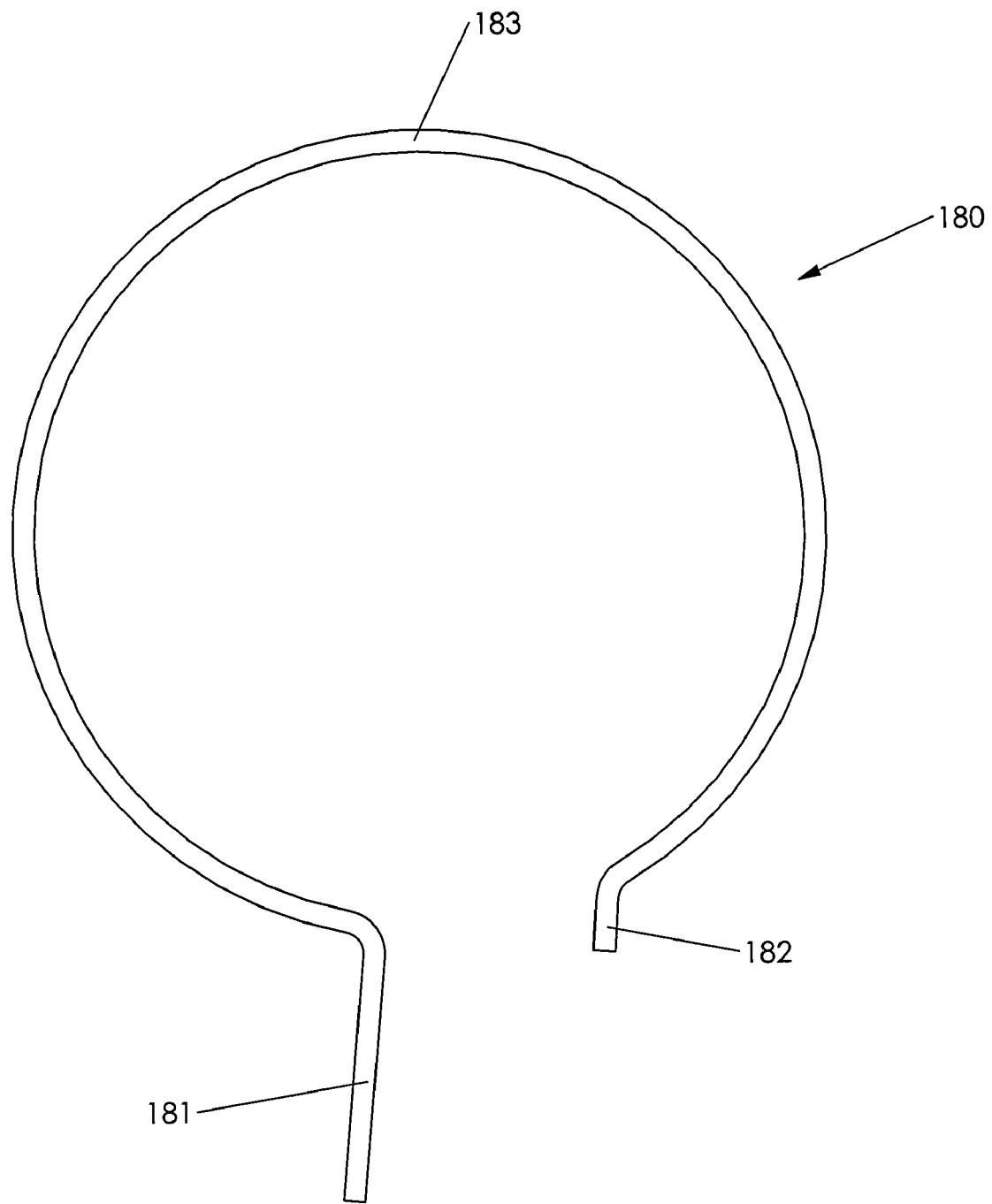
FIG. 4 is a top plan view of an embodiment of an attachment fastener, specifically a snap ring, for use with the grease gun shown in FIG. 1.
Figure 5:
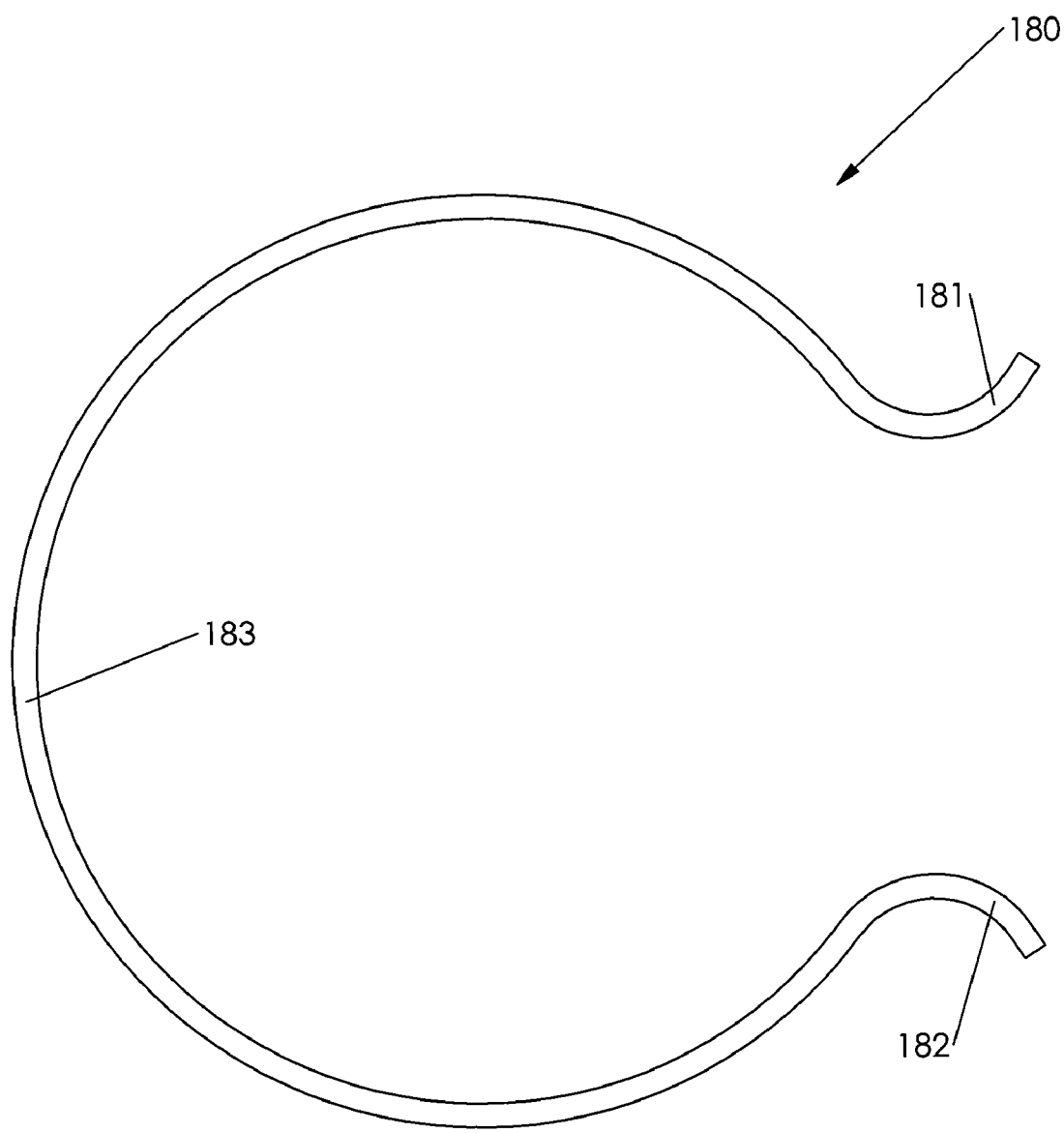
FIG. 5 is a top plan view of an alternate embodiment of an attachment fastener, specifically a snap ring, for use with the grease gun shown in FIG. 1.

The attachment assembly 170 may include a retention fastener 180. The retention fastener 180 may be a snap ring. In one or more examples of embodiments, the retention fastener 180 may be of any shape or size to surround at least a portion of a barrel 130. In one or more examples of embodiments, the retention fastener 180 may be any suitable type of fastener or retaining ring consisting of a semi-flexible material which may include open ends and which can be snapped into place, for example into a groove, to permit rotation but to prevent lateral movement. As illustrated in FIG. 4, the retention fastener 180 may include a first end portion 181 and a second end portion 182. Connecting the first and second end portions 181, 182 may be a retention portion 183. The retention portion 183 may be generally curved or arcuate in shape. The first and second end portions 181, 182 may be of differing lengths and may be arranged in parallel to one another. As shown in FIG. 4, the first end portion 181 is longer than the second end portion 182. In an alternate embodiment and illustrated in FIG. 5, the first and second end portions 181, 182 may be the same length and may be arranged to angle away from each other.

The retention fastener 180 may be removably received by the attachment assembly 170. As illustrated in FIGS. 7 and 12, the retention fastener 180 may be engaged or retained in the concentric grooves 171. The retention fastener 180 may be biased inward and may have a natural or free state such that the inner diameter may be slightly narrower or smaller than the outer diameter 131 of the barrel 130. In this regard, the retention fastener 180 may be biased or have a free state such that the outer diameter may fit or be retained with a portion of the concentric grooves 171, illustrated as the lower snap ring groove 173. When the barrel 130 is inserted into the barrel mount 120, the barrel 130 will apply force against the bias of the retention fastener 180, urging the retention fastener 180 into the lower snap ring groove 173 to prevent unwanted removal of the barrel 130. In one or more examples of embodiments, the retention fastener 180 may be adapted to be mounted or retained on the barrel 130. In this arrangement, the retention fastener 180 may have a bias outward and a natural or free state that is slightly larger than the inner portion 122 of the barrel mount 120. The attachment assembly 170 may be adapted to receive or engage a retention fastener 180 according to this arrangement.

Figure 10:
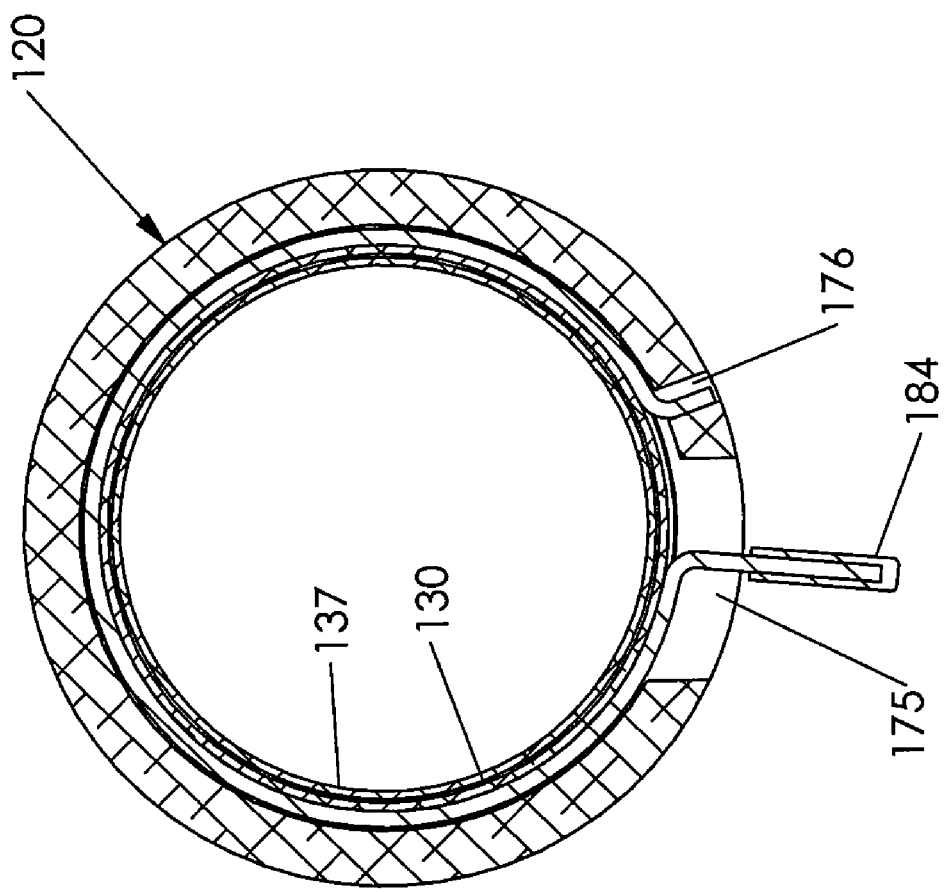
FIG. 10 is a cross-sectional view of an embodiment of the grease gun and barrel of FIG. 1, taken along line 9-9 of FIG. 8.
Figure 11:
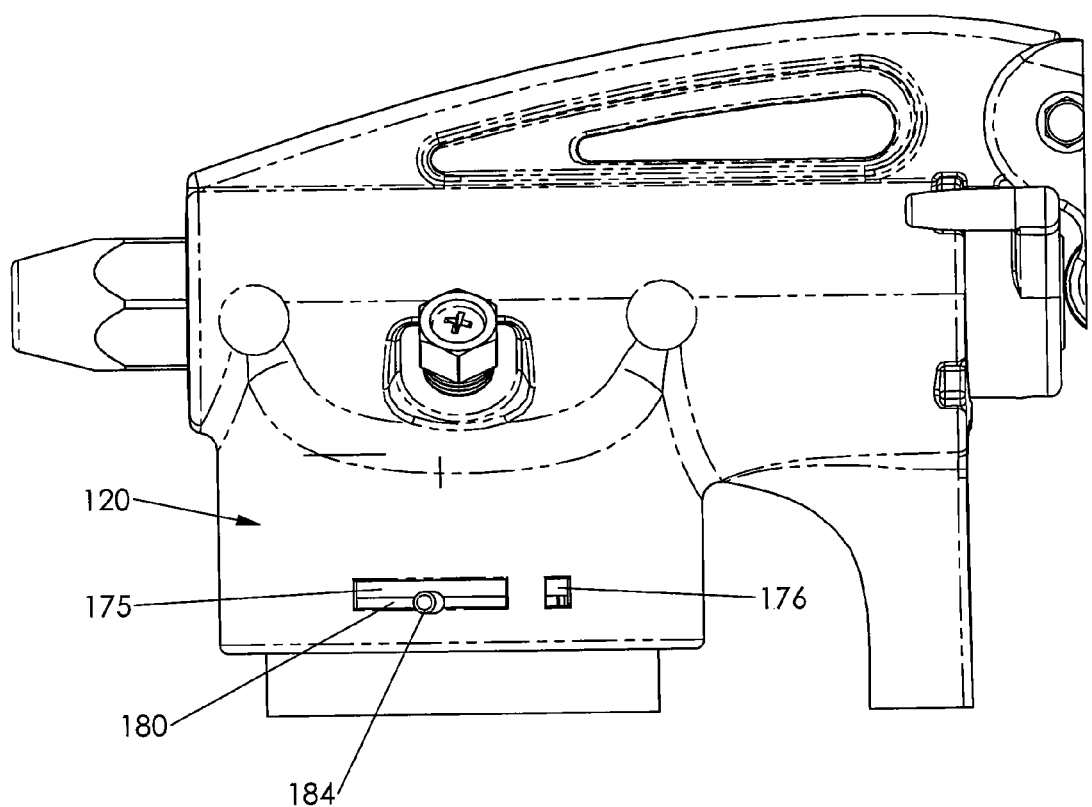
FIG. 11 is a partial side elevation view of the grease gun body of the grease gun shown in FIG. 1, showing the attachment fastener in the engaged position.

The retention fastener 180 may be further retained in the attachment assembly 170 by engagement with a first adjustment aperture or slot 175 and second retention aperture 176. As illustrated in FIGS. 6-9, the first and second apertures 175, 176 are ports or holes through a portion of the barrel mount 120. The first end portion 181 of the retention fastener 180 may be positioned to operably engage the first adjustment aperture 175. Similarly, the second end portion 182 of the retention fastener 180 may be positioned to operably engage the second retention aperture 176. As shown in FIG. 9, the first and second apertures 175, 176 may be arranged in parallel to one another. In one or more examples of embodiments, and illustrated in FIG. 10, the first and second apertures 175, 176 may be arranged at an angle to one another. Further, the first adjustment aperture 175 may be larger in length or size than the second retention aperture 176 to account for deformation or adjustment of the retention fastener 180. The second retention aperture may be of any size, length or arrangement suitable for engaging the second end portion 182 of the retention fastener 180 to provide resistance during deformation or adjustment of the retention fastener 180.

As illustrated in FIG. 9, the barrel mount 120 may also include a third adjustment aperture or slot 177 and fourth retention aperture 178. The third and fourth apertures 177, 178 are ports or holes through a portion of the barrel mount 120 positioned approximately on the opposite side of the barrel mount 120 from the first and second apertures 175, 176. The first end portion 181 of the retention fastener 180 may be positioned to operably engage the third adjustment aperture 177. Similarly, the second end portion 182 of the retention fastener 180 may be positioned to operably engage the fourth retention aperture 178. The third and fourth apertures 177, 178 may be arranged in parallel to one another. In one or more examples of embodiments, third and fourth apertures 177, 178 may be arranged at an angle to one another. Further, the third adjustment aperture 177 may be larger in length or size than the fourth retention aperture 178 to account for deformation or adjustment of the retention fastener 180. The combination of the first and second apertures 175, 176 and third and fourth apertures 177, 178 provide the advantage of dominant hand use. The retention fastener 180 may be elastically deformed in order to install or remove the fastener 180 from the attachment assembly 170. Accordingly, the retention fastener 180 may be alternately engaged with the first and second apertures 175, 176 or third and fourth apertures 177, 178 to enable a user to use their dominant hand (left or right hand) to remove or attach a barrel 130 to the grease gun body 110.

When positioned in the attachment assembly 170, the retention fastener 180 may retain the barrel 130 axially in the receiving bore 122 of the barrel mount 120. As illustrated in FIGS. 7 and 9, the retention fastener 180 has a shape to surround a portion of the barrel 130. Further, the retention fastener 180 may be sized to provide an interference fit or slip fit onto a barrel groove or slot or trench 132 provided on the outer diameter 131 of the barrel 130. The resulting operational engagement or engagement of the retention fastener 180 with the barrel groove 132 results in the barrel 130 being held in place in the barrel mount 120.

The retention fastener 180 may include a user operable engagement assembly or handle 184. As illustrated in FIG. 9, the handle 184 may be operably connected to the first end portion 181 and may include a gripping member for grasping by a user. In one or more examples of embodiments, the handle 184 may be unitary with the first end portion 181 or may include a separate portion which may slide on or engage with the first end portion 181. The first end portion 181 carrying the handle 184 is provided within the first or third adjustment apertures 175, 177. The adjustment apertures 175, 177 are sized for slidable or lateral movement of the handle 184 between an engaged position (FIGS. 6-12), a disengaged position (FIGS. 13-18), and a locked position (FIGS. 19-24). The first end portion 181 and/or handle 184 may assist a user in positioning or compressing the retention fastener 180 within the barrel mount 120 and specifically within the first or third adjustment apertures 175, 177.

FIGS. 25-28 illustrate a material or grease source, specifically the grease barrel 130. As shown in FIG. 1, the barrel 130 may be selectively and removably connected to the barrel mount 120 of the grease gun body 110. Referring to FIGS. 25-28, the barrel 130 may be formed of a cross-section shaped to mate with the receiving bore 122 of the barrel mount 120. In one or more examples of embodiments, the grease barrel 130 may be a reusable barrel which may be bulk loaded with grease or loaded with a disposable cartridge. Further, in one or more examples of embodiments, the grease barrel 130 may be generally cylindrical, tubular, or any other shape or arrangement to operably engage the barrel mount 120. The barrel 130 may be any suitable size for the purposes of the present invention.

Figure 25:
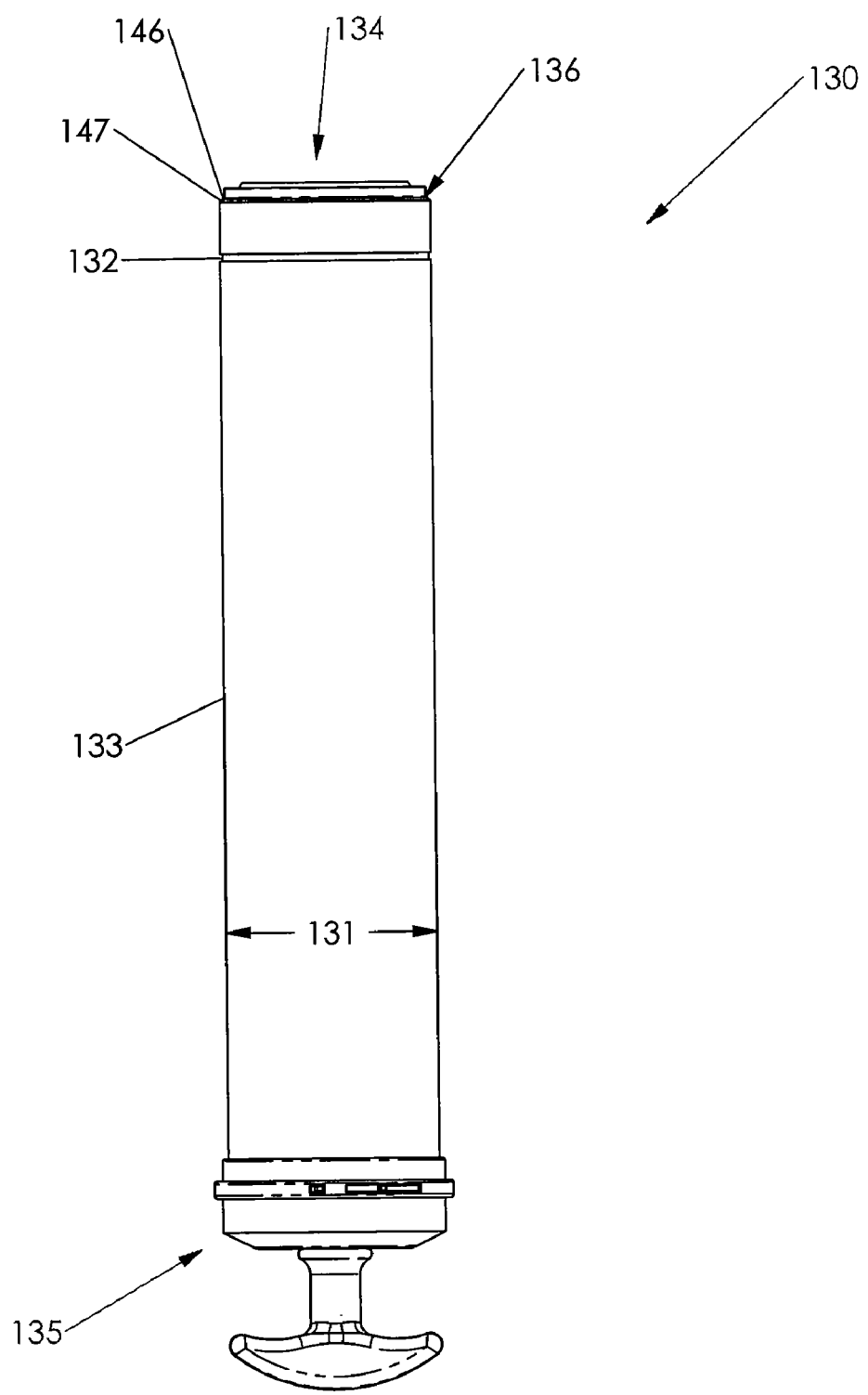
FIG. 25 is a side elevation view of a barrel assembly for use with the grease gun of FIG. 1.

As shown in FIG. 25, the barrel 130 may include a grease gun engaging end or first end 134 and a second end 135. The barrel 130 may also include a barrel groove or slot or trench or channel 132 positioned on the outer surface 133 of the barrel 130. The groove 132 may be a circumferential channel extending the entire outer surface of the barrel 130. The groove 132 may also be positioned to correspond with the location of the retention fastener 180 of the attachment assembly 170 in the receiving bore 122. Once positioned, the retention fastener 180 may securely engage with the groove 132, as shown in FIGS. 7 and 12. In one or more examples of embodiments, the groove 132 may be provided in one or more segments, continuous or not continuous, on the outer surface 133 of the barrel 130. Further, in one or more examples of embodiments, the groove 132 may be of different depths, heights, sizes or positions on the outer surface 133 of the barrel 130 to correspond with the size or position of the retention fastener 180.

As illustrated in FIG. 25, the barrel 130 may also include a beveled upper surface 136 on the grease gun engaging end 134. The beveled upper surface 136 may include a top portion 146 having a diameter smaller than the outer diameter 131 of the barrel 130. Connecting the top portion 146 to the barrel 130 may be a bevel or chamfer edge portion 147. The beveled upper surface 136 may assist in engaging the barrel 130 with the retention fastener 180 of the attachment assembly 170.

Figure 26:
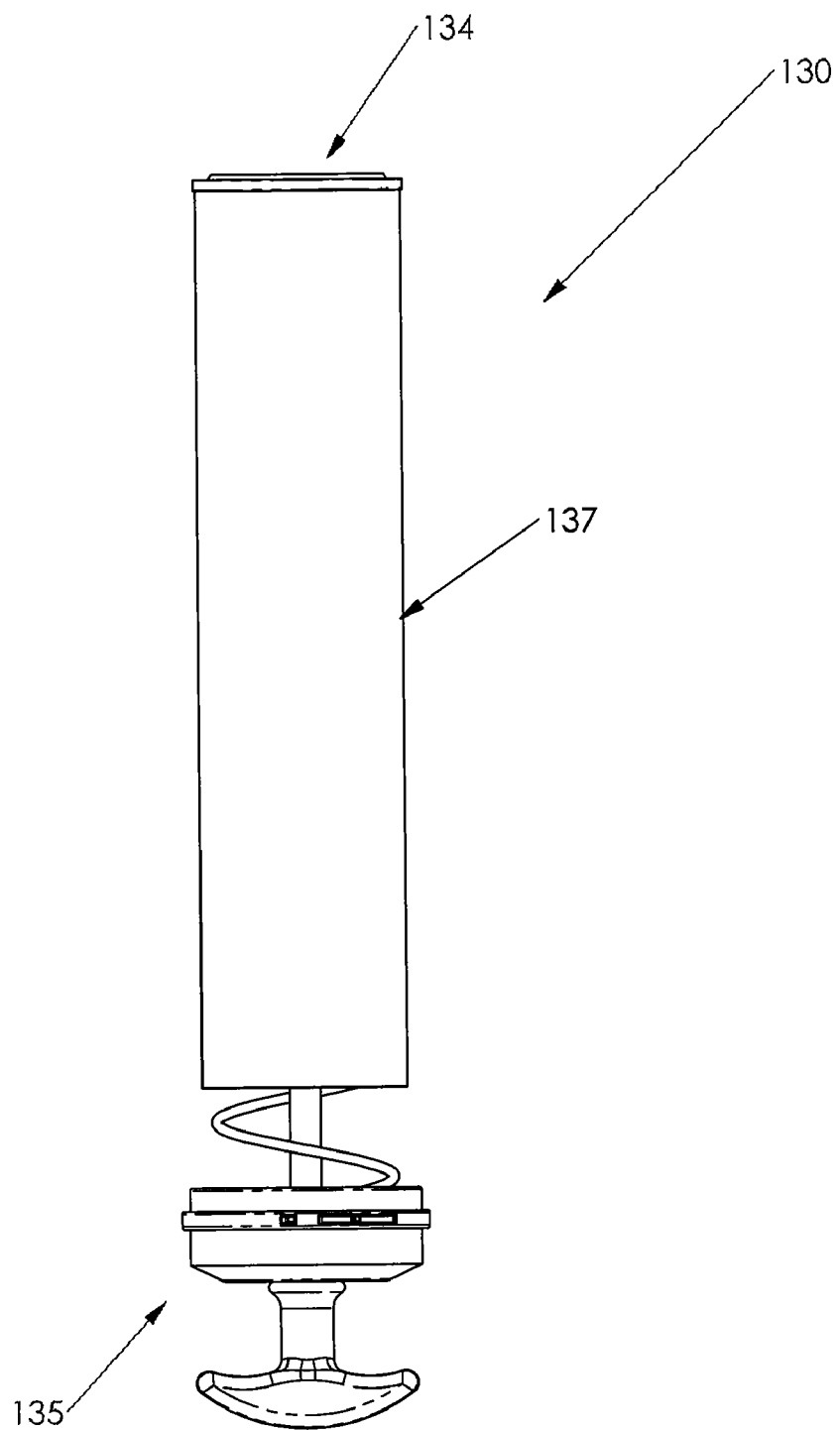
FIG. 26 is a side elevation view of the barrel assembly of FIG. 25, absent the barrel and showing a grease cartridge.

As illustrated in FIG. 26, the barrel 130 may carry a grease cartridge 137. The grease cartridge 137 may be mounted within the barrel by any suitable means known in the art. In one or more examples of an embodiment, and comparing FIGS. 32 and 36, the barrel 130 may be used with or without a cartridge 137. Further, in one or more examples of embodiments, the barrel 130 may include a hollow inner chamber which may carry bulk loaded grease.

Figure 27:
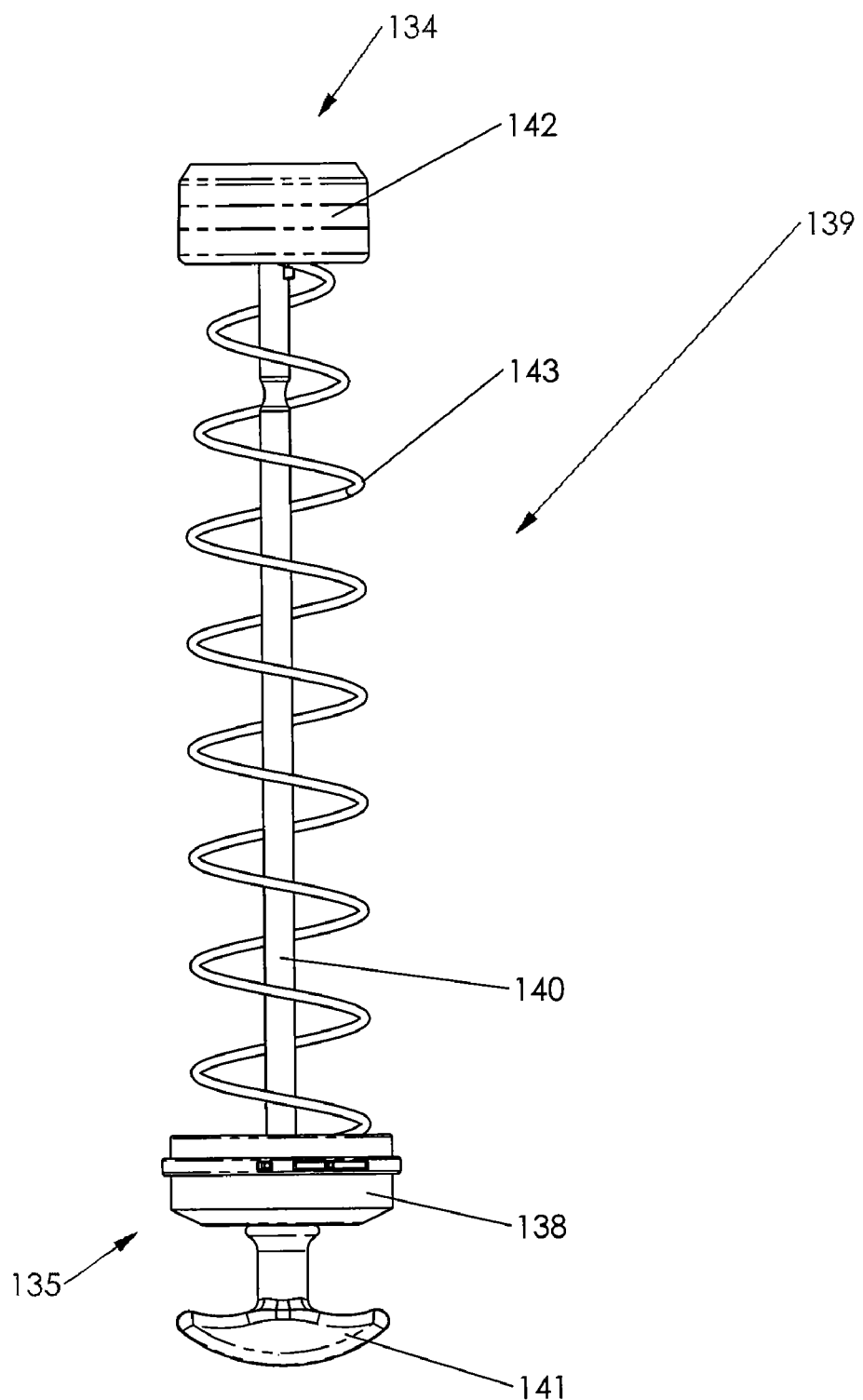
FIG. 27 is a side elevation view of the plunger assembly for use with the barrel assembly of FIG. 25.
Figure 28:
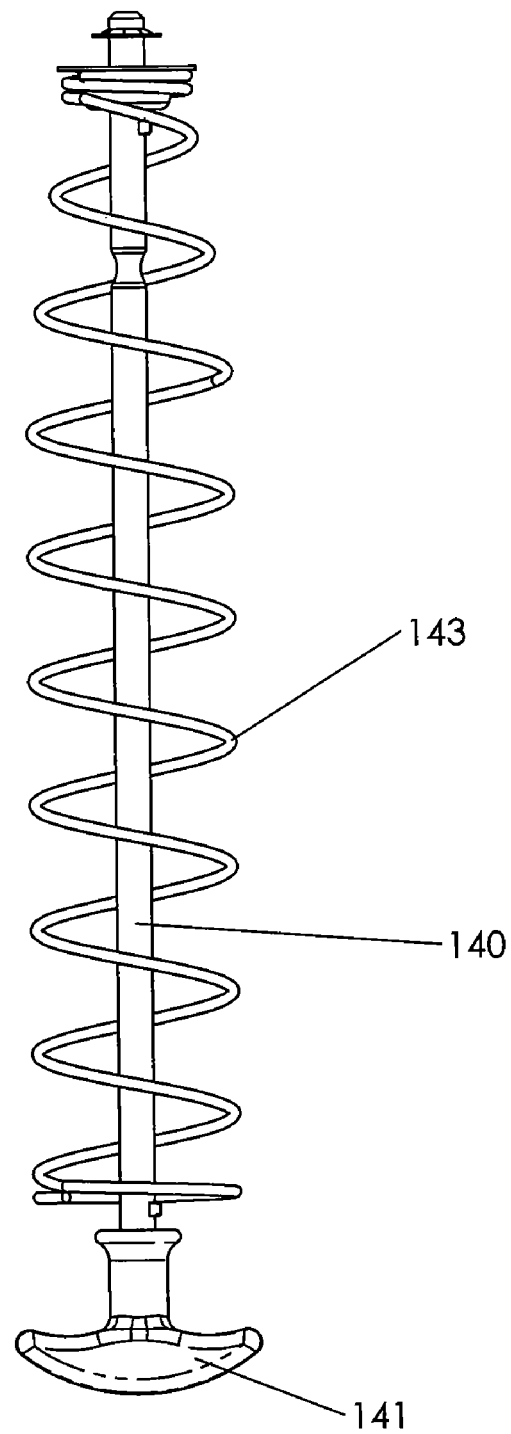
FIG. 28 is a side elevation view of the plunger and follower spring for use with the barrel assembly of FIG. 25.

As shown in FIG. 27, the barrel second end 135 may have a cap 138 which slidably receives a plunger assembly or plunger 139. The plunger 139 may be a manually operated plunger 139 formed of a longitudinal rod 140 having a handle 141 on one end and a grease displacement member 142 at the other end. As shown in FIGS. 27 and 28, a spring or preloaded spring or follower spring 143 may be provided surrounding the longitudinal rod 140 of the plunger 139 and may be retained between the cap 138 and the grease displacement member 142. The spring 143 generally may bias and force grease toward the first end 134 and away from the second end 135 of the barrel 130. In one or more examples of embodiments, the spring 143 of the plunger 139 may also bias the barrel 130 away from the grease gun body 110 when attached. In other words, to attach the barrel 130, the spring 143 is compressed, at least slightly. Thus, the spring 143, which is used to push grease into the grease gun head 112, may also push the second end 135 of the barrel 130 away from the grease gun head 112. The resulting force pushes the retention fastener 180, which is engaged with the barrel groove 132, into the lower snap ring groove 173 and prevents the retention fastener 180 from expanding. This may prevent the barrel 130 from being ejected from the grease gun head 112 when the spring 143 forces grease into the grease gun head 112.

In operation and use, engagement and disengagement of the barrel 130 from the grease gun body 110 may be accomplished by actuation of the retention fastener 180. In one or more examples of embodiments, the retention fastener 180 may be removably received by the attachment assembly 170, may be biased inward, and may have a natural or resting state with an inner diameter smaller than the outer diameter 131 of the barrel 130 and an outer diameter corresponding to or smaller than the diameter formed by the lower snap ring groove 173. FIGS. 6-12 illustrate an embodiment of the barrel mount 120 for a grease gun 100, in which the attachment assembly 170, and in particular the retention fastener 180, is provided in the engaged position with a barrel 130. The handle 184 of the retention fastener 180 may be moved laterally within the first adjustment aperture or slot 175 of the barrel mount 120 to increase the diameter of the retention fastener 180. The barrel 130 may then be received within the receiving bore 122 of the barrel mount 120 in the grease gun head 112. By releasing the handle 184, the retention fastener 180 biases inward, thereby tightening around the barrel 130. The barrel 130 may then be adjusted upward or downward to engage the retention fastener 180 with the barrel groove 132. The barrel 130 follower spring 143 then biases the barrel 130 away from the grease gun body 110, effectively pushing the retention fastener 180 into a space formed by the lower snap ring groove 173 and corresponding barrel groove 132. The retention fastener 180 is in a contracted state forming an interference fit with the barrel 130, thereby preventing removal of the barrel 130 from the receiving bore 122. In the engaged position, the retention fastener 180 is in contact with the barrel groove 132 and a portion of the lower snap ring groove 173, but rests against the inner wall 145 of the barrel groove 132 (see FIGS. 7 and 12).

In one or more examples of embodiments, the barrel mount 120 may be engaged with a barrel 130 without manual actuation of the handle 184 of the retention fastener 180. A user may press the barrel 130, and specifically the grease gun engaging end 134, into the receiving bore 122 of the barrel mount 120. The retention fastener 180 may receive the beveled upper surface 136, moving along the top portion 146 to the chamfer edge portion 147 to the outer surface 133 of the barrel 130, concurrently expanding outward or increasing in diameter until reaching the barrel groove 132. Upon reaching the barrel groove 132, the retention fastener 180 may then move toward its resting state in the barrel groove 132. The retention fastener 180 is engaging both the barrel groove 132 and concentric grooves 171 of the attachment assembly 170, preventing disengagement of the barrel 130 from the grease gun 100. As a result, the retention fastener 180 does not need to be manually moved or actuated by a user to engage the barrel 130 with the grease gun 100 during insertion into the barrel mount 120 receiving bore 122 of the grease gun body 110.

FIGS. 19-24 illustrate an embodiment of the barrel mount 120 for a grease gun 100, in which the attachment assembly 170, and in particular the retention fastener 180, is provided in the locked position with the barrel 130. The locked position may prevent accidental disengagement of the barrel 130 from the barrel mount 120 upon inadvertent or accidental actuation of the retention fastener 180, for example, but not limited to, inadvertent actuation of the handle 184 by a user or contact with an external surface or object. In the locked position, the retention fastener 180 is arranged between the contracted position of the engaged state and the expanded position of the disengaged state. To this end, the retention fastener 180 is in contact with the lower snap ring groove 173 and a portion of the barrel groove 132, but rests against the outer wall 174 of the lower snap ring groove 173 (see FIGS. 20 and 24).

Upon quick connection and retention of the barrel 130 with a grease gun body 110, a user may operate and use the grease gun 100. The user may actuate the actuating lever 116, which in turn operates the piston assembly 150. Material, specifically grease, may then be drawn from the grease barrel 130 into the grease gun body 110 through the inlet throughbore 126. The grease may then enter the compression chamber 154, where the grease is pressurized by contacting the piston assembly 150. In one or more examples of an embodiment, the grease may pass from the inlet throughbore 126 directly into contact with the piston assembly 150. The grease may then be discharged through the nozzle 157.

Figure 18:
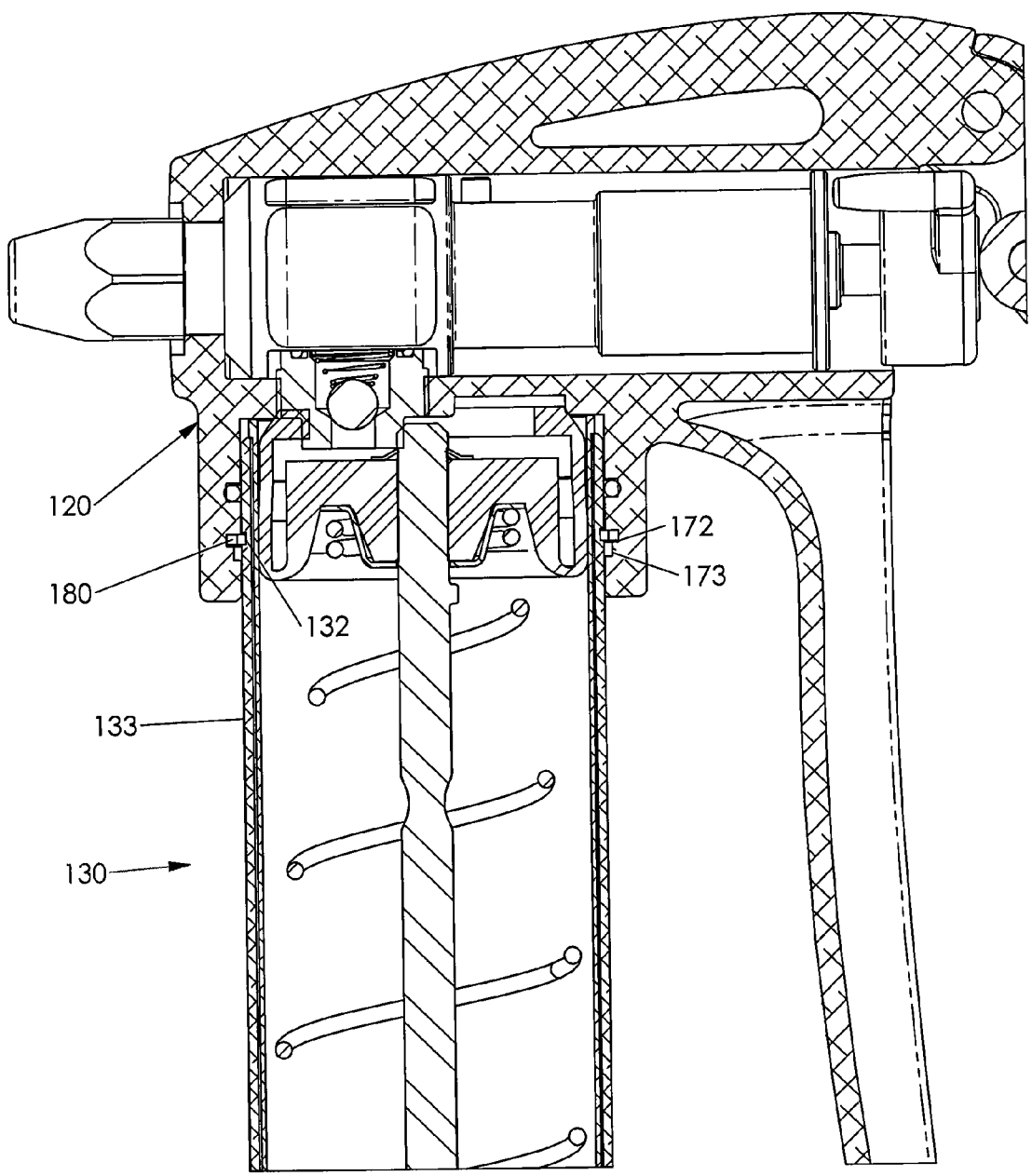
FIG. 18 is a partial cross-sectional view of the grease gun of FIG. 14, showing the attachment fastener in the disengaged position.
Figure 23:
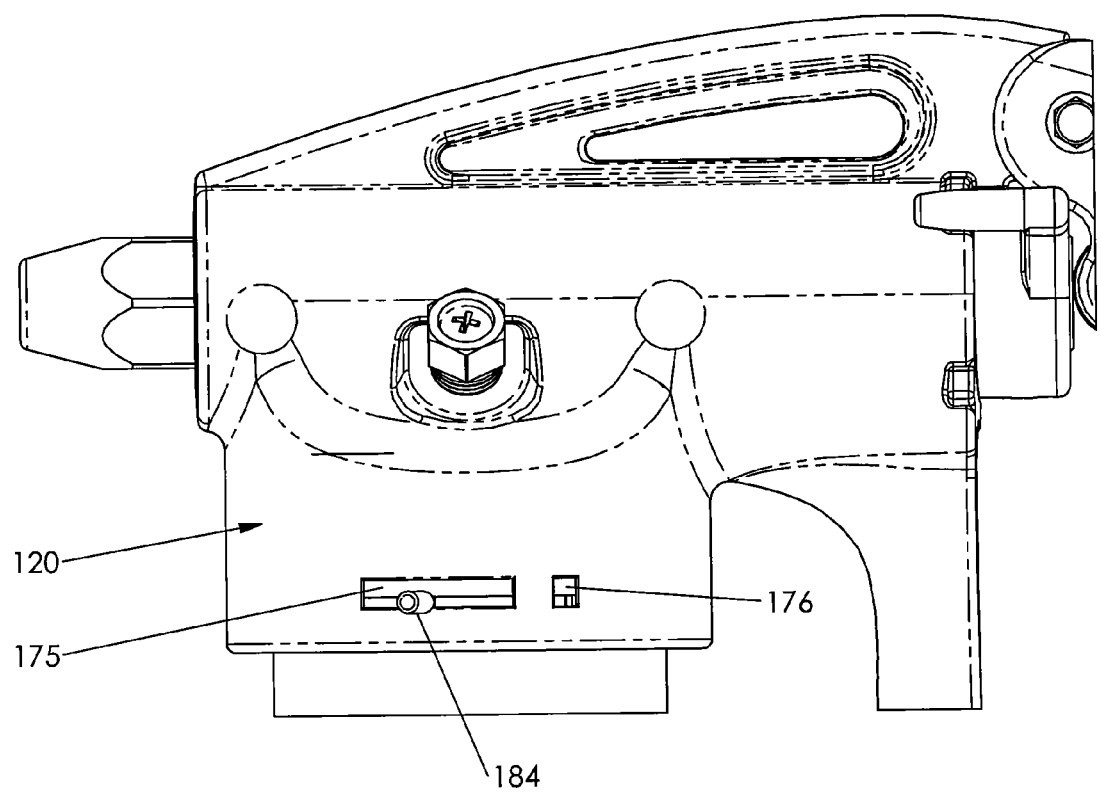
FIG. 23 is a partial side elevation view of the grease gun body of the grease gun shown in FIG. 19, showing the attachment fastener in the locked position.
Figure 24:
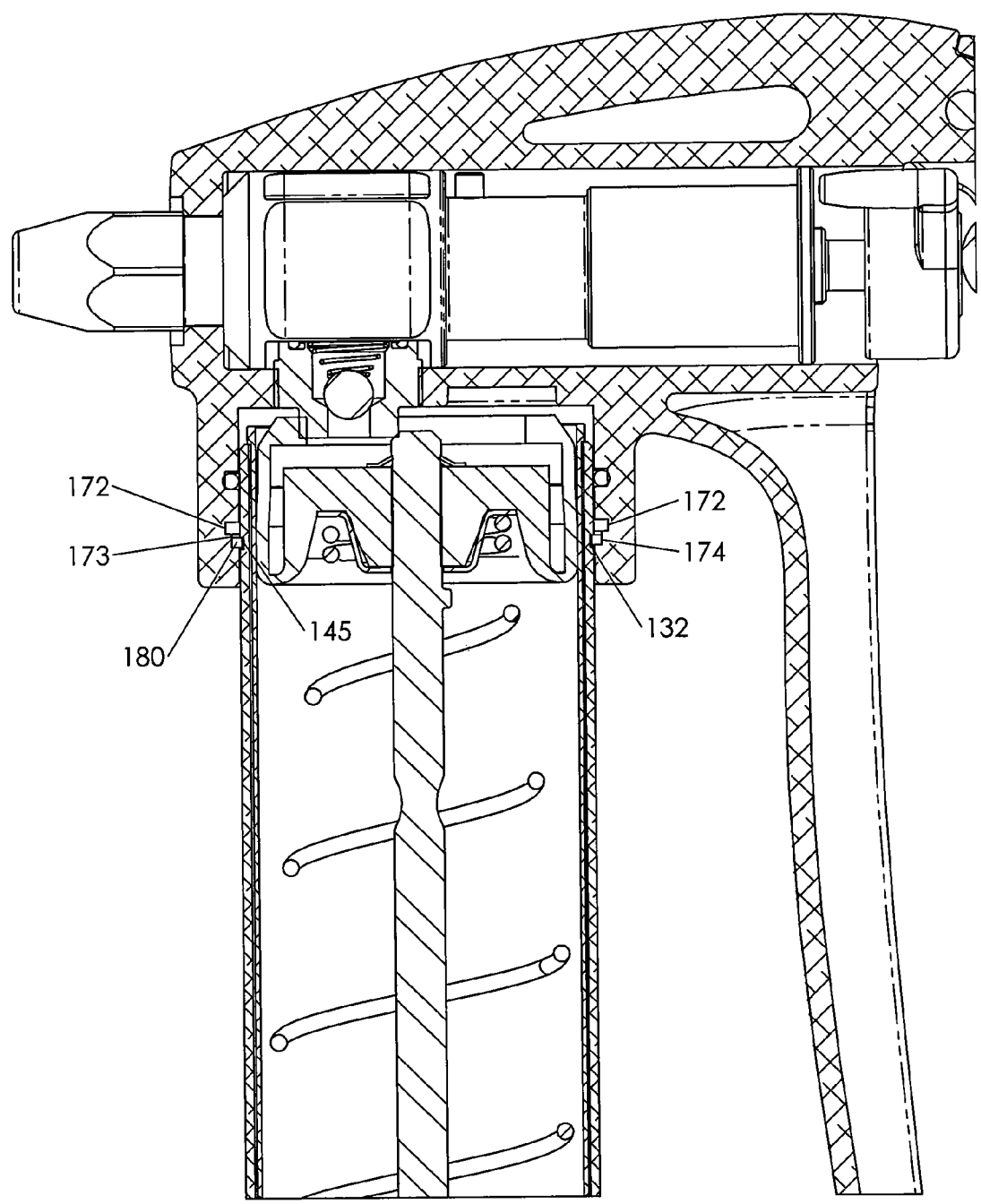
FIG. 24 is a partial cross-sectional view of the grease gun of FIG. 19, showing the attachment fastener in the locked position.

FIGS. 13-18, illustrate an embodiment of the barrel mount 120 for a grease gun 100 in which the attachment assembly 170, and in particular the retention fastener 180, is provided in the disengaged position. Disengagement of the retention fastener 180 permits quick and efficient removal of the barrel 130 from the grease gun body 110. The handle 184 of the retention fastener 180 may be moved within the first adjustment slot 175 and against the bias to increase the diameter of the retention fastener 180. Concurrently, the retention fastener 180 shifts concentric grooves 171. As illustrated in FIGS. 14 and 18, the retention fastener 180 moves from the lower snap ring groove 173 to the upper snap ring groove 172, while maintaining contact with the barrel groove 132. To move the handle 184 and expand the diameter of the retention fastener 180, the application of force on the barrel 130 toward the bore 122 of the barrel mount 120 may be necessary. The application of force may facilitate the shift of the retention fastener 180 from the lower snap ring groove 173 to the upper snap ring groove 172. Once aligned with the upper snap ring groove 172, the handle 184 may be further actuated, increasing the diameter of the retention fastener 180 until the fastener 180 is received by the upper snap ring groove 172. Concurrently, the retention fastener 180 is withdrawn from the barrel groove 132, disengaging the retention fastener 180 from the barrel 130. The barrel 130 is now free to be removed from the barrel mount 120. Once removed, a barrel 130 may then be inserted into the barrel mount 120. Upon insertion of the barrel 130, the handle 184 may be manually actuated or automatically moved as described above, resulting in returning the retention fastener 180 to the engaged position.

An alternative embodiment of the quick connect and disconnect grease gun assembly 170 is shown in FIGS. 29-36. In this embodiment, the grease gun 100, grease gun body 110, grease gun head 112 and barrel 130 may be substantially as described herein, except that the grease gun head 112 is provided with an alternative attachment assembly 270. Operation and particular components described herein are substantially the same and like numbers have been used to illustrate the like components. In the illustrated example, a cap 220 may be provided and in communication with the grease barrel 130, and specifically the grease gun engaging end 134 of the grease barrel 130. The cap 220 may provide protection against accidental discharge or spilling of the barrel 130 contents, or may be used to protect and store the contents of a barrel 130 when the barrel 130 is removed or disengaged from the grease gun head 112. The barrel 130, carrying bulk loaded grease or a grease cartridge, may be provided for operational engagement with the cap 220 and/or a barrel mount 120. The cap 220 and/or barrel mount 120 may include an attachment assembly 270. The attachment assembly 270 may include a retention fastener 180 and a cam assembly 290. The retention fastener 180 may take the form of the fastener described herein and shown in FIGS. 1-24. However, replacing the handle assembly defined by handle 184 is the cam assembly 290. The cam assembly 290 is positioned for engagement with and between the first and second end portions 181, 182 of the retention fastener 180. The cam assembly 290 may include a rotatable handle portion 292, whereupon rotational force is applied upon the handle portion 292, the retention fastener 180 diameter may expand and contract. In this regard, the barrel 130 may be inserted or connected with the cap 220 or to engage the grease gun barrel mount 120. Once connected, the handle portion 292 of the cam assembly 290 may be rotated to contract or reduce the diameter of the retention fastener 180 to engage the barrel groove 132 of the barrel 130. Similarly, to remove or disengage the barrel 130, the cam assembly 290 may be rotated to expand or increase the diameter of the retention fastener 180 to disengage the barrel groove 132 of the barrel 130.

The attachment assembly 270 may include an upper groove or channel 272 for receiving and retaining the retention fastener 180. The attachment assembly 270 may further include a lower groove or ledge 273 positioned below the upper groove 272 to prevent disengagement of the barrel 130 upon accidental rotation of the cam assembly 290. In one or more examples of embodiments, and when engaged with the barrel mount 120, the barrel 130 follower spring 143, which is used to push grease into the grease gun head 112, may also apply a force against the grease gun head 112, pushing the barrel 130 away from the head 112. This force may push the retention fastener 180 against a portion of the upper groove 272 and/or the lower ledge 273, preventing ejection of the barrel 130 from the grease gun head 112 when the follower spring 143 forces grease into the gun head 112.

The foregoing embodiments provide advantages over currently available devices. In particular the quick connect and disconnect attachment assembly and associated features described herein decreases the amount of time involved in installing or removing a barrel from a grease gun. This decrease in time leads to increased efficiency, as time used for operation is not spent on engagement and disengagement of a barrel. Further, the attachment assembly allows for a user to easily engage and disengage a barrel. Engagement and disengagement of the barrel from the grease gun does not require the need for tools. In addition, the assembly decreases risk of injury to a user, as there is little to no rotation required to install a barrel and the assembly ensures safe securement of the barrel in the grease gun to guard against accidental or inadvertent removal. Further, the attachment assembly provides convenience and flexibility for left hand and right hand operation, as the retention fastener may be adjusted to allow a user to operate the quick connect and disconnect attachment assembly with either their left or right hand. Additionally, the assembly allows for an improved sealing assembly enabling a radial seal between a portion of the outer surface of the grease barrel and a portion of the grease gun barrel mount.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to certain embodiments, persons skilled in the art will recognize that changes may be made in form and detail without departing from the spirit and scope of the invention.

What is claimed is:

1. A grease gun comprising:
   a body having a reservoir connection aperture including an inner portion, an outer portion and a plurality of concentric grooves disposed to receive a retention fastener positioned along the inner portion;
   a grease reservoir in communication with the reservoir connection aperture, the grease reservoir having a groove in a portion of an outside surface of the grease reservoir; and
   the retention fastener removably received by first and second concentric grooves, the retention fastener in operational engagement with the first groove to engage and disengage the grease reservoir and in operational engagement with the second groove to removably retain the grease reservoir in the grease gun.

2. The grease gun of claim 1, wherein the retention fastener further comprises a user operable engagement assembly to adjust the retention fastener to engage and disengage the retention fastener with the grease reservoir groove.

3. The grease gun of claim 2, wherein the user operable engagement assembly includes a handle.

4. The grease gun of claim 3, further comprising:
   the reservoir connection aperture having a first adjustment slot and a second retention aperture;
   the retention fastener having a first end and a second end, the first end removably received in the first adjustment slot and the second end in communication with the second retention aperture; and
   the handle in communication with the first end of the retention fastener.

5. The grease gun of claim 4, further comprising:
   the reservoir connection aperture having a third adjustment slot and a fourth retention aperture; and
   the retention fastener is removable to allow adaptable engagement between the first adjustment slot and second retention aperture and third adjustment slot and fourth retention aperture.

6. The grease gun of claim 2, wherein the user operable engagement assembly includes a cam assembly.

7. The grease gun of claim 1, wherein the grease reservoir is a grease barrel.

8. The grease gun of claim 1, wherein the concentric grooves comprise an upper channel and a lower channel, the upper and lower channels in operational alignment.

9. The grease gun of claim 8, wherein the upper channel has a greater diameter than the lower channel.

10. The grease gun of claim 9, wherein the retention fastener engages the lower channel to retain the grease reservoir.

11. The grease gun of claim 10, wherein the retention fastener engages the upper channel to enable adjustment of the retention fastener to disengage with the grease reservoir groove.

12. The grease gun of claim 1, wherein the inner portion of the reservoir connection aperture includes a radial sealing assembly for engagement with the grease reservoir.

13. The grease gun of claim 1, wherein the grease reservoir groove extends about the entire outside circumference of the grease reservoir.

14. The grease gun of claim 1, wherein the retention fastener is a snap ring.

15. The grease gun of claim 14, wherein the snap ring has an inward bias.

16. A method of mounting a barrel to a grease gun comprising:
   inserting the barrel into a barrel mount in a grease gun body;
   aligning a groove on the barrel with a snap ring having a user operable engagement assembly and movably retained within first and second concentric grooves in the barrel mount;
   engaging the snap ring with the groove on the barrel and the first concentric groove during insertion of the barrel; and
   engaging the snap ring with the groove on the barrel and the second concentric groove during operation of the grease gun, thereby preventing disengagement of the barrel from the grease gun.

17. The method of claim 16, wherein the inserting step further comprises manually actuating the user operable engagement assembly.

18. The method of claim 16, further comprising:
   actuating the user operable engagement assembly to move the snap ring from the second to the first concentric grooves and expanding the snap ring to a diameter greater than an outer diameter of the barrel, disengaging the snap ring from the groove on the barrel; and
   withdrawing the barrel from the barrel mount in the grease gun body.

19. A grease gun comprising:
   a body comprising:
      a barrel mount having a first adjustment aperture, a second retention aperture and a recess with an inner portion and an outer portion;
      a first groove and a second groove in operational alignment and positioned around the circumference of the inner portion of the barrel mount, the first groove having a diameter greater than the second groove;
      a snap ring having a first end, a second end and a retention portion, the first end in communication with the first adjustment aperture, the second end in engagement with the second retention aperture and the retention portion movable within and removably received by the first and second grooves; and
   a grease barrel having an outer surface and a slot in a portion of the outer surface, the barrel removably received in the recess of the barrel and the snap ring removably engaged with the slot.

20. The grease gun of claim 19, wherein the inner portion of the barrel mount includes a radial sealing member for removable engagement with the outer surface of the grease barrel.

* * * * *